United States Patent
Suwa et al.

(10) Patent No.: US 12,055,279 B2
(45) Date of Patent: Aug. 6, 2024

(54) HEADLIGHT DEVICE MODULE INCLUDING A CONDENSING OPTICAL UNIT AND A LIGHT GUIDE MEMBER WITH CUTTOFF-LINES FORMING PARTS

(71) Applicant: Mitsubishi Electric Corporation, Tokyo (JP)

(72) Inventors: Masashige Suwa, Tokyo (JP); Tomohide Morimoto, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/015,542

(22) PCT Filed: May 13, 2021

(86) PCT No.: PCT/JP2021/018140
§ 371 (c)(1),
(2) Date: Jan. 11, 2023

(87) PCT Pub. No.: WO2022/044444
PCT Pub. Date: Mar. 3, 2022

(65) Prior Publication Data
US 2023/0258309 A1    Aug. 17, 2023

(51) Int. Cl.
*B60Q 1/16* (2006.01)
*B62J 6/022* (2020.01)
(Continued)

(52) U.S. Cl.
CPC ............... *F21S 41/24* (2018.01); *B60Q 1/16* (2013.01); *B62J 6/022* (2020.02); *F21S 41/265* (2018.01)

(58) Field of Classification Search
CPC ........ F21S 41/24; F21S 41/141; F21S 41/322; F21S 41/265; F21S 41/147; F21S 41/148; B60Q 1/04; B60Q 1/16
See application file for complete search history.

(56) References Cited

U.S. PATENT DOCUMENTS

| 7,073,931 | B2 * | 7/2006 | Ishida | ................... | F21S 41/148 |
| | | | | | 362/327 |
| 7,097,334 | B2 * | 8/2006 | Ishida | ................... | F21S 41/148 |
| | | | | | 362/327 |

(Continued)

FOREIGN PATENT DOCUMENTS

| JP | 2002-45668 A | 2/2002 |
| JP | 2003-5312 A | 1/2003 |

(Continued)

OTHER PUBLICATIONS

International Search Report and Written Opinion mailed on Jun. 22, 2021, received for PCT Application PCT/JP2021/018140, filed on May 13, 2021, 9 pages including English Translation.

*Primary Examiner* — Ismael Negron
(74) *Attorney, Agent, or Firm* — XSENSUS LLP

(57) ABSTRACT

A headlight module includes: a light source; a condensing optical unit that allows light generated by the light source to enter and transforms the light into condensed light; and a light guide member including a first cutoff line formation part that forms light in a first light distribution pattern from the condensed light, a second cutoff line formation part that forms light in a second light distribution pattern from the condensed light, a first emission surface that emits light in a first illuminance distribution pattern corresponding to the first light distribution pattern, and a second emission surface that emits light in a second illuminance distribution pattern corresponding to the second light distribution pattern. Light in a combined illuminance distribution pattern obtained by (Continued)

adding the light in the first illuminance distribution pattern and the light in the second illuminance distribution pattern is emitted.

18 Claims, 19 Drawing Sheets

(51) Int. Cl.
    *F21S 41/24*     (2018.01)
    *F21S 41/265*     (2018.01)

(56) References Cited

U.S. PATENT DOCUMENTS

| | | | | |
|---|---|---|---|---|
| 7,207,705 B2* | 4/2007 | Ishida | ............... | F21S 41/24 362/346 |
| 7,401,947 B2* | 7/2008 | Wanninger | ............ | F21S 41/24 362/558 |
| 7,810,975 B2* | 10/2010 | Specht | ............... | F21S 41/24 362/555 |
| 9,400,089 B2* | 7/2016 | Nakaya | ............... | F21S 41/24 |
| 9,423,088 B2* | 8/2016 | Park | ............... | F21S 41/24 |
| 9,822,947 B2* | 11/2017 | Owada | ............... | F21S 41/24 |
| 10,139,646 B2* | 11/2018 | Gromfeld | ............ | F21S 41/24 |
| 10,168,014 B2* | 1/2019 | Lee | ............... | F21S 41/24 |
| 10,663,131 B1* | 5/2020 | Zhu | ............... | F21S 41/141 |
| 10,753,562 B1* | 8/2020 | Alisafaee | ............ | F21S 41/24 |
| 11,371,669 B2* | 6/2022 | Kemetmüller | ...... | F21S 41/24 |
| 2009/0046474 A1 | 2/2009 | Sato et al. | | |

FOREIGN PATENT DOCUMENTS

| | | |
|---|---|---|
| JP | 2009-48786 A | 3/2009 |
| JP | 2012-129002 A | 7/2012 |

* cited by examiner

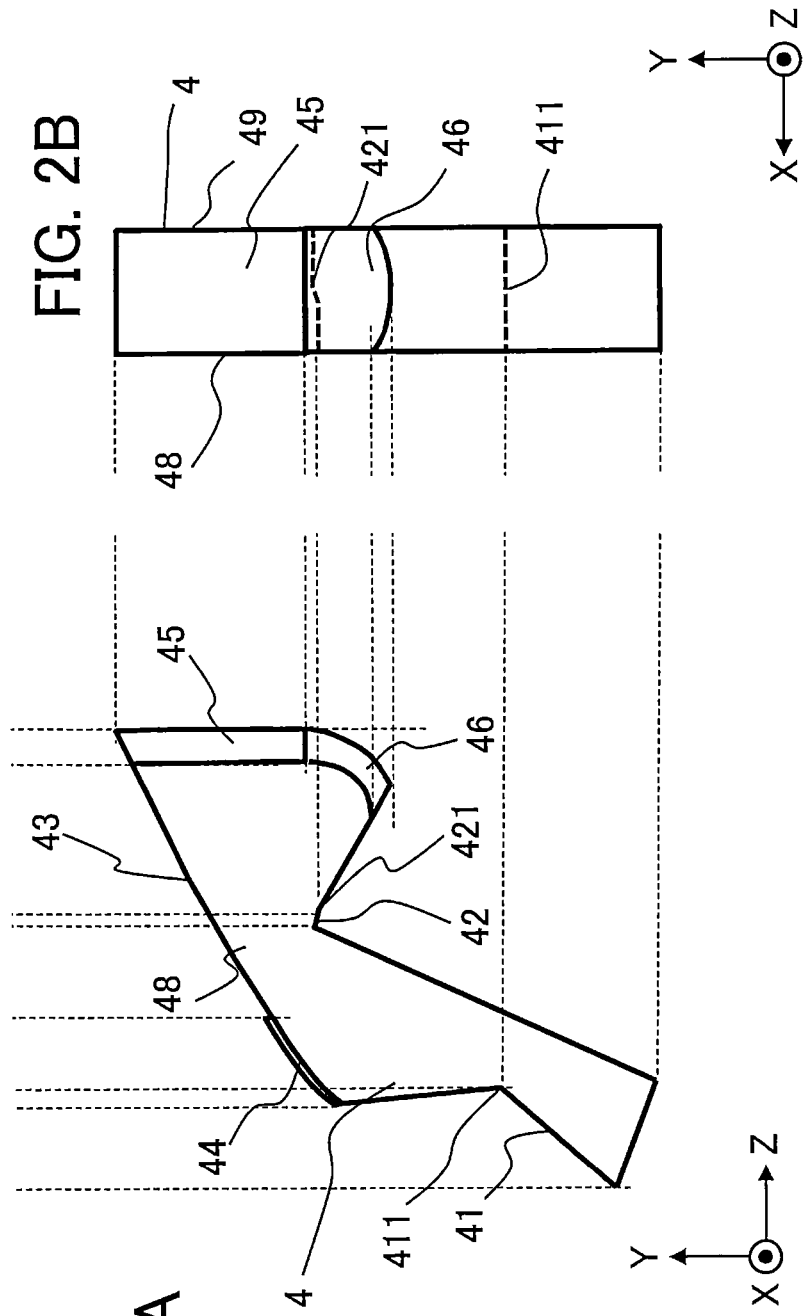
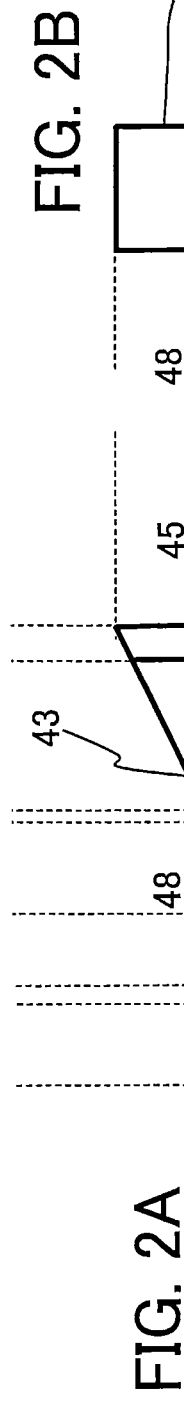
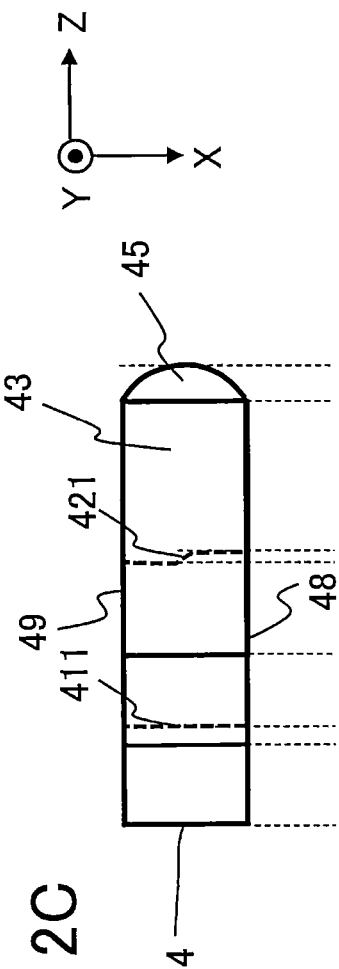

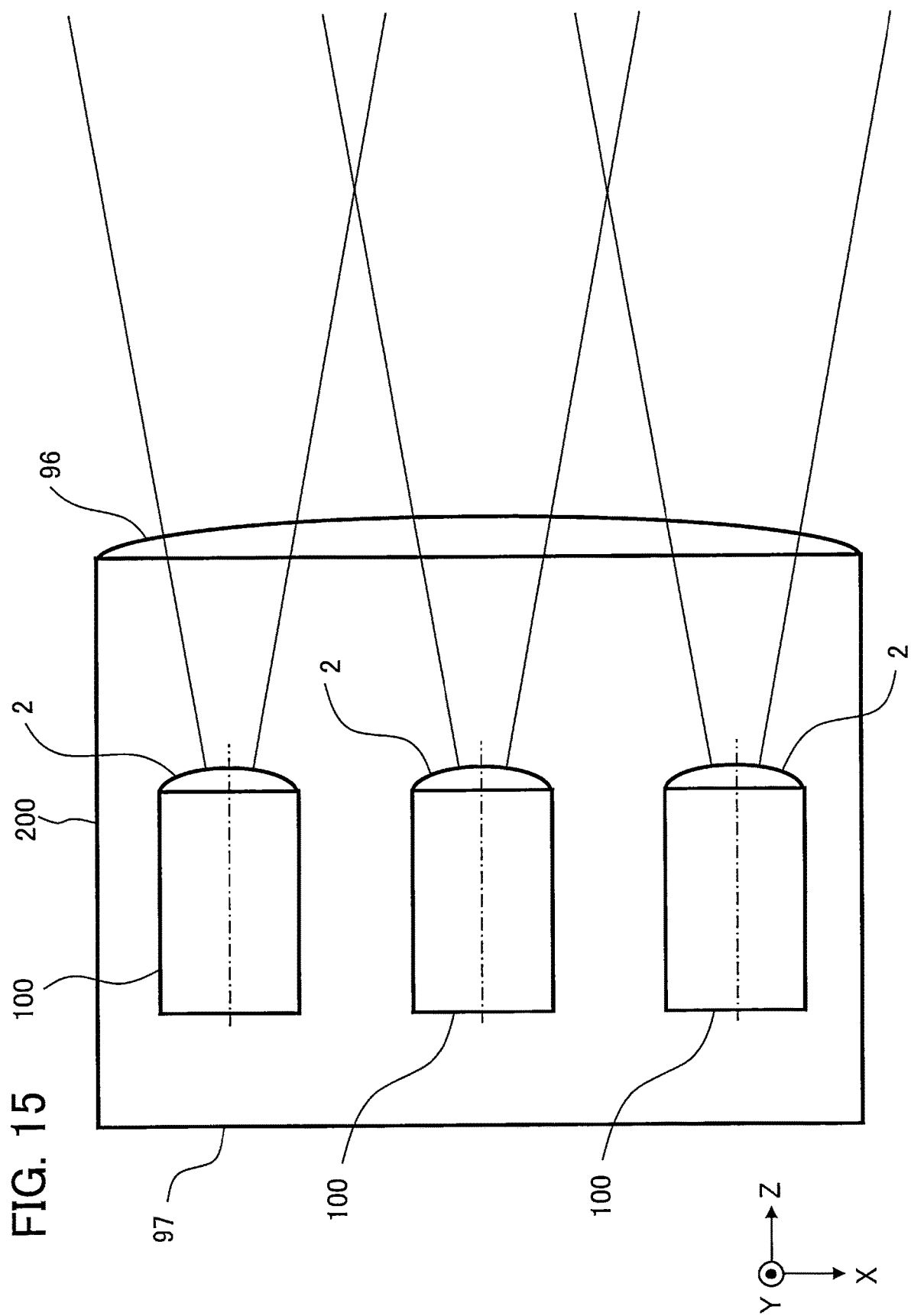

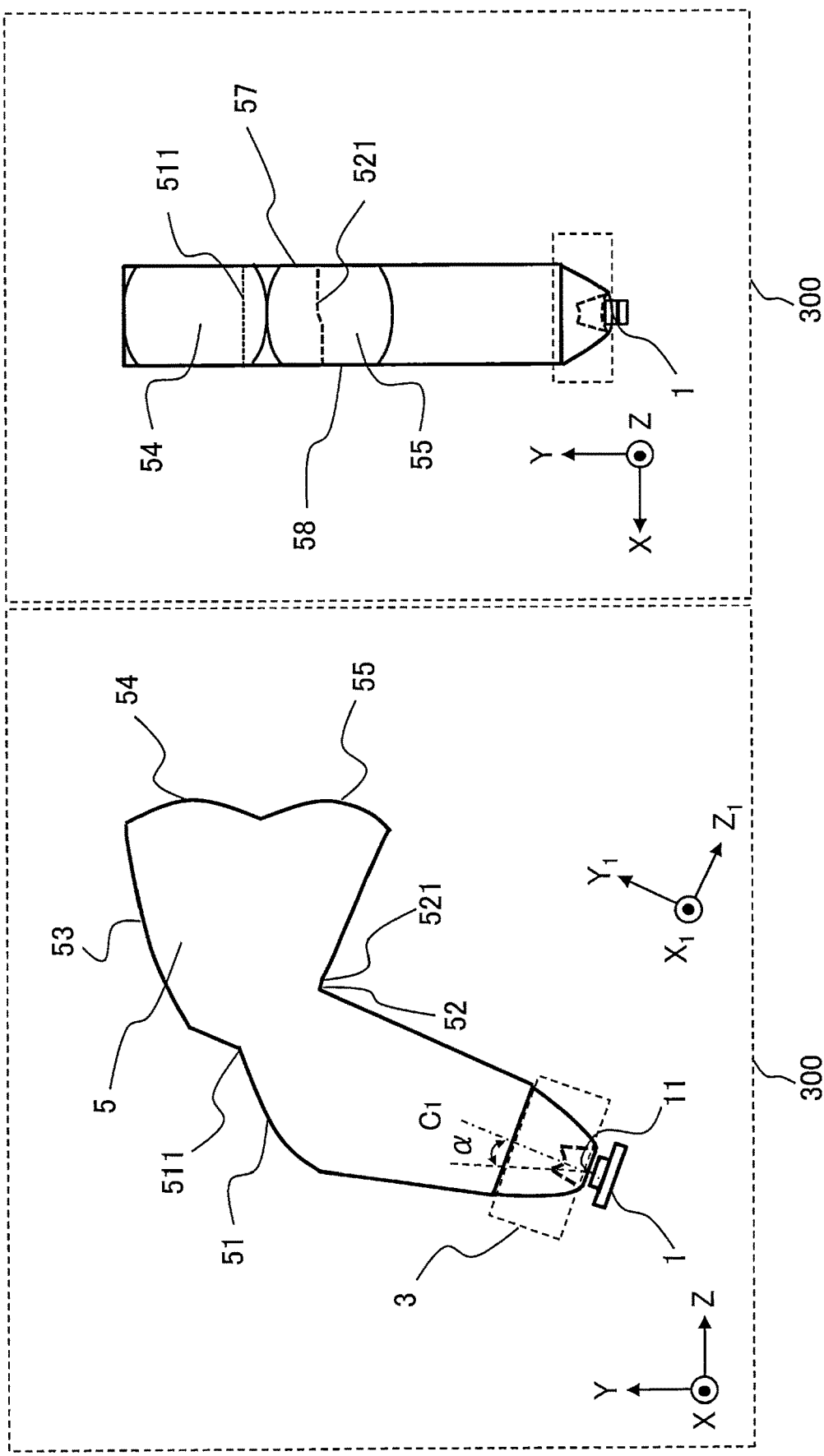

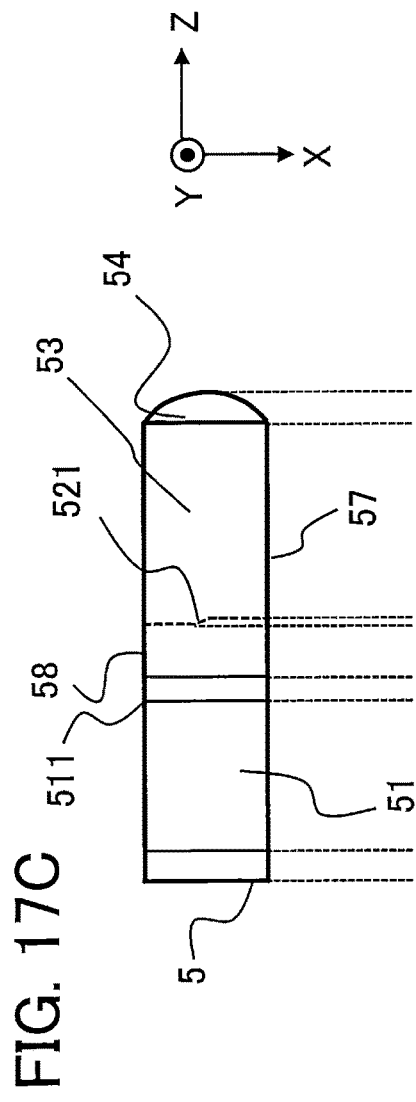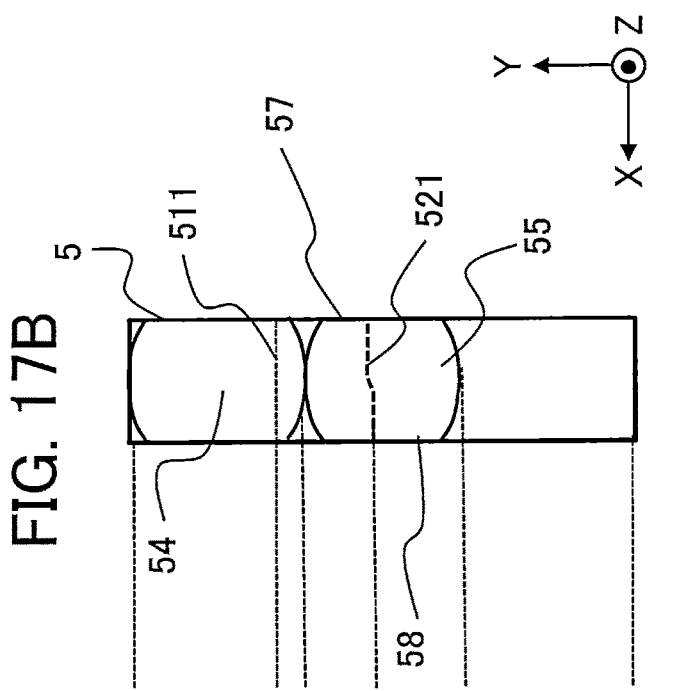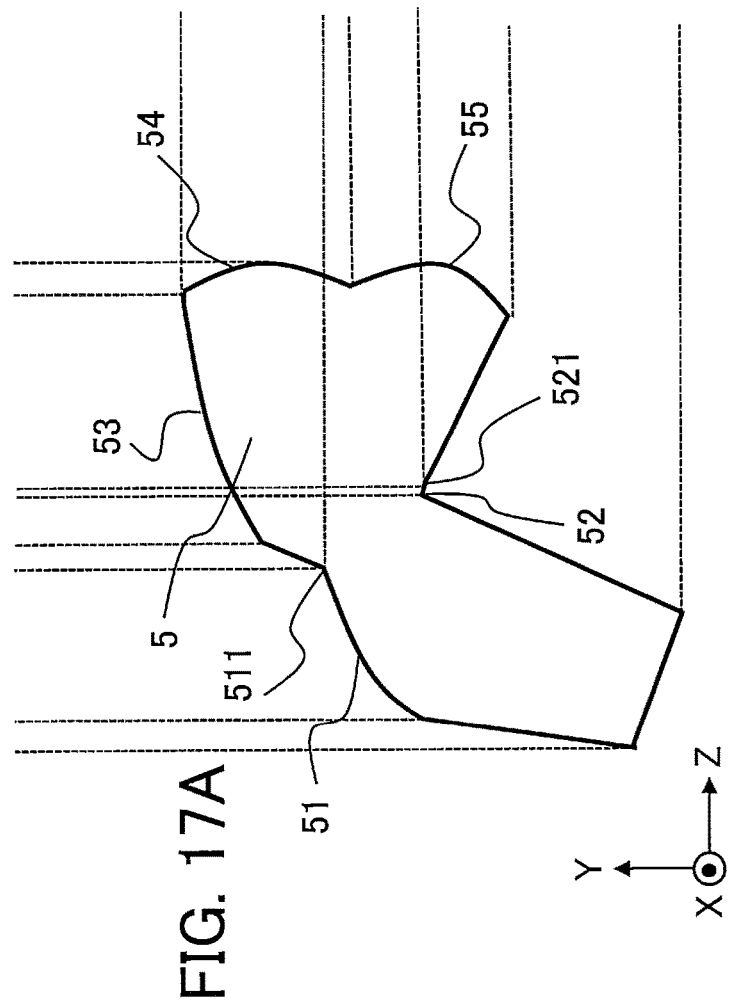

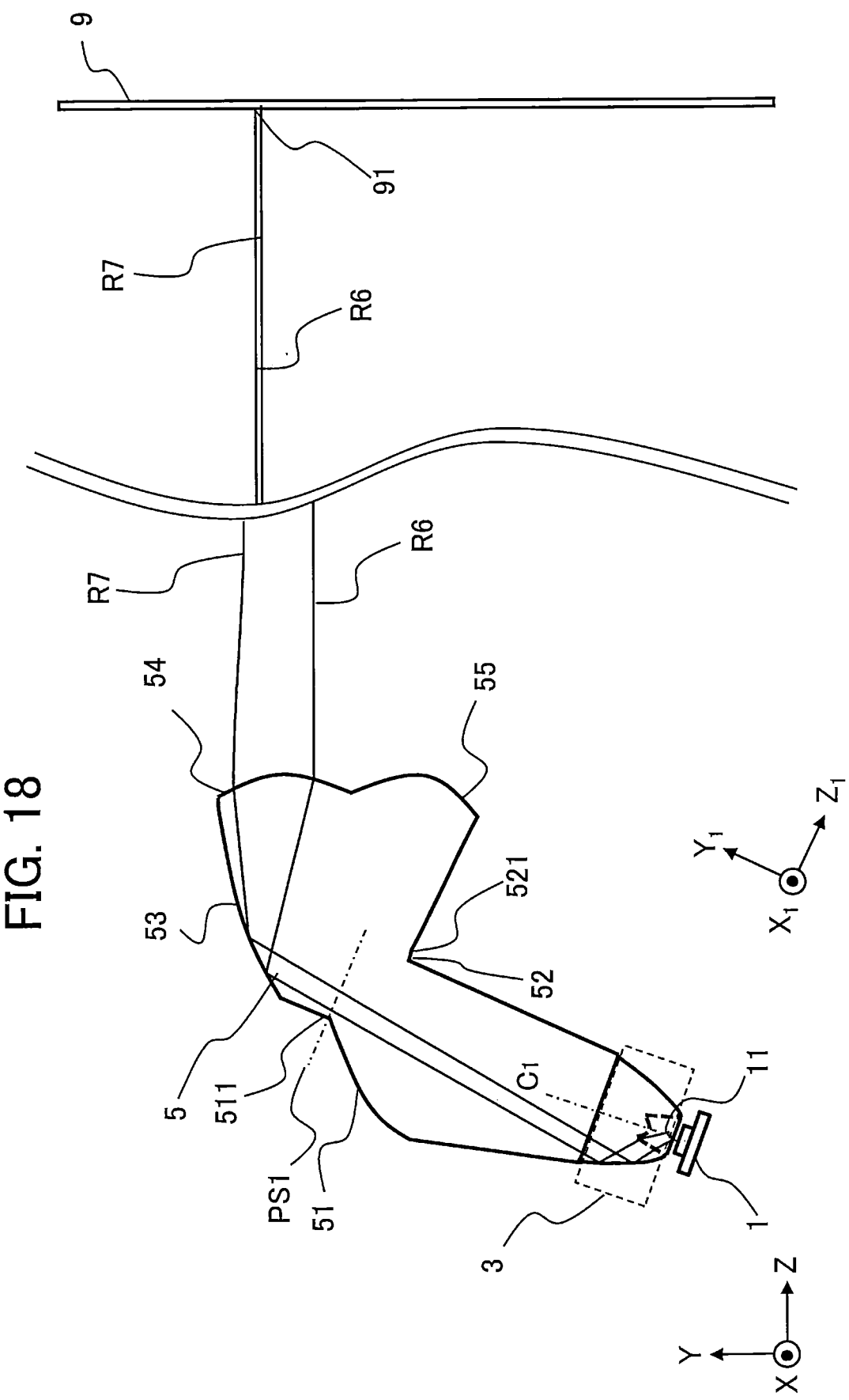

HEADLIGHT DEVICE MODULE INCLUDING A CONDENSING OPTICAL UNIT AND A LIGHT GUIDE MEMBER WITH CUTTOFF-LINES FORMING PARTS

CROSS-REFERENCE TO RELATED APPLICATIONS

The present application is based on PCT filing PCT/JP2021/018140, filed May 13, 2021, which claims priority from PCT filing PCT/JP2020/031853, filed Aug. 24, 2020, the entire contents of each are incorporated herein by reference.

TECHNICAL FIELD

The present disclosure relates to a headlight module and a headlight device including the headlight module.

BACKGROUND ART

A headlight device for a vehicle needs to satisfy a light distribution pattern stipulated by road traffic rules or the like. The "light distribution" means luminosity distribution of a light source with respect to a space. Namely, the light distribution is spatial distribution of light emitted from the light source. Further, the "luminosity" represents the level of intensity of light emitted by an illuminant. The luminosity is a value obtained by dividing luminous flux flowing in a minute solid angle in a certain direction by the solid angle.

The light distribution pattern stipulated in the road traffic rules in regard to the low beam for an automobile is in a horizontally long shape that is narrow in the upward/downward direction. Further, so as not to dazzle the drivers of oncoming vehicles, a cutoff line as a boundary line at the top of the light distribution pattern is required to be distinct. Namely, it is required that a region above the cutoff line (i.e., outside the light distribution pattern) is dark and a region below the cutoff line (i.e., inside the light distribution pattern) is bright, that is, the cutoff line is distinct.

Here, the "cutoff line" means a separator line regarding brightness/darkness of light that is formed when the light emitted from the headlight device is applied to a wall or a screen, that is, a separator line at the top of the light distribution pattern. Namely, the "cutoff line" is a light brightness/darkness boundary line at the top of the light distribution pattern. In other words, the cutoff line is a boundary line between an upper region inside the light distribution pattern where the light is bright and a region outside the light distribution pattern where the light is dark. The cutoff line is a term that is used for explaining a function of adjusting an illumination direction of the light emitted from the headlight device when vehicles pass by each other. The light emitted from the "headlight device for passing by" is referred to also as a "low beam".

Further, it is required that a region below the cutoff line (namely, a region inside the light distribution pattern and slightly below the cutoff line) is a region of the maximum illuminance. This maximum illuminance region is referred to as a "high illuminance region". Here, the "region below the cutoff line" means the upper region inside the light distribution pattern and corresponds to a part of the headlight device for illuminating far positions. In order to realize such a distinct cutoff line, it is desirable that no major chromatic aberration, blurring or the like occur to the cutoff line. The "occurrence of blurring to the cutoff line" means that the cutoff line becomes unclear.

Furthermore, the shape of the cutoff line is stipulated by laws/regulations in each country. In general, in the low beam of a headlight device for an automobile, the cutoff line is in a stepped shape including a rising line.

Moreover, since a headlight device is arranged at the front of an automobile, designability is important. Especially, although many of conventional headlight devices have a circular opening, a headlight device with a further increased degree of freedom of design is being requested. For example, a headlight device having an opening (i.e., emission surface for emitting light) that is vertically long in the vertical direction of the vehicle has rarely been seen so far, and is considered to be able to increase the designability.

In order to let the above-described headlight device have the opening vertically long in the vertical direction of the vehicle and realize a complicated light distribution pattern, a configuration using a light blocking plate or the like is commonly considered. Further, for example, Patent Reference 1 discloses a structure to form a horizontal cutoff line by using a light guide member having permeability.

PRIOR ART REFERENCE

Patent Reference

Patent Reference 1: Japanese Patent Application Publication No. 2012-129002

SUMMARY OF THE INVENTION

Problem to be Solved by the Invention

While a device described in the Patent Reference 1 forms a horizontal and straight cutoff line, the device is incapable of forming a cutoff line in a complicated shape (e.g., the stepped shape including the rising line) required of a headlight device for an automobile.

An object of the present disclosure is to provide a headlight module and a headlight device capable of emitting light in an illuminance distribution pattern having a cutoff line in a desired shape.

Means for Solving the Problem

A headlight module in the present disclosure includes: a light source; a condensing optical unit that allows light generated by the light source to enter and transforms the light into condensed light; and a light guide member including a first cutoff line formation part that forms light in a first light distribution pattern from the condensed light, a second cutoff line formation part that forms light in a second light distribution pattern from the condensed light, a first emission surface that emits light in a first illuminance distribution pattern corresponding to the first light distribution pattern, and a second emission surface that emits light in a second illuminance distribution pattern corresponding to the second light distribution pattern. Light in a combined illuminance distribution pattern obtained by adding the light in the first illuminance distribution pattern emitted from the first emission surface and the light in the second illuminance distribution pattern emitted from the second emission surface is emitted.

A headlight device in the present disclosure includes one or more headlight modules described above.

Effect of the Invention

According to the present disclosure, light in an illuminance distribution pattern having a cutoff line in a desired shape can be emitted.

BRIEF DESCRIPTION OF THE DRAWINGS

FIG. 2A to FIG. 2C are a side view, a front view and a top view showing a configuration of a light guide member of the headlight module according to the first embodiment.

FIG. 15 is a schematic top view showing a configuration of a headlight device according to a third embodiment.

FIG. 16A and FIG. 16B are diagrams showing a configuration of a headlight module according to a fourth embodiment.

FIG. 17A to FIG. 17C are a side view, a front view and a top view showing a configuration of a light guide member of the headlight module according to the fourth embodiment.

FIG. 18 is a diagram showing optical paths of light emitted from a first emission surface of the light guide member included in light condensed by a condensing optical unit.

MODE FOR CARRYING OUT THE INVENTION

Figure 1A:
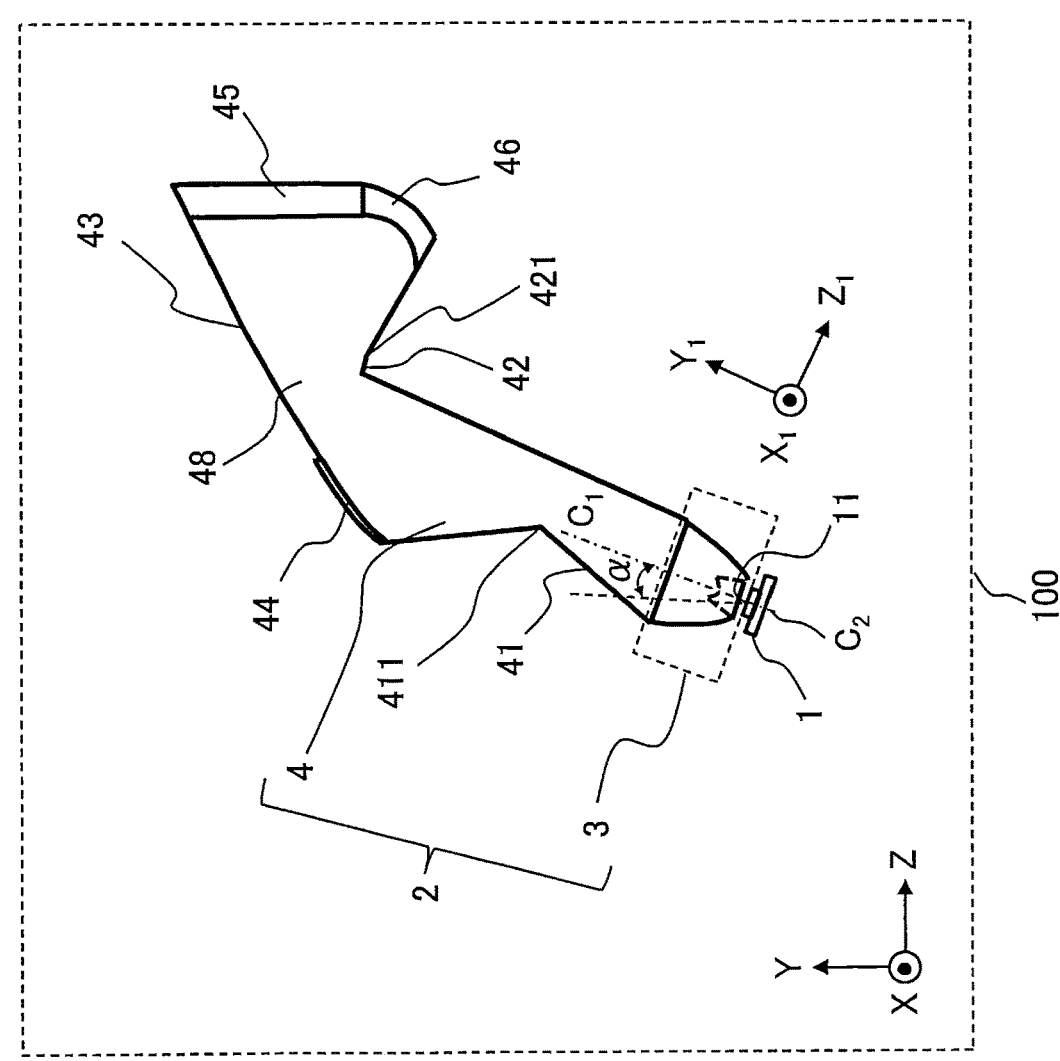
FIG. 1A and FIG. 1B are diagrams showing a configuration of a headlight module according to a first embodiment.

Headlight modules according to embodiments and headlight devices including the headlight modules will be described below with reference to the drawings. The following embodiments are just examples and it is possible to appropriately combine embodiments and appropriately modify each embodiment.

In the following description of the embodiments, coordinate axes and coordinate planes of an XYZ coordinate system will be used to facilitate the description. A left-right direction of a vehicle is defined as an X-axis direction. A rightward direction when facing a forward direction of the vehicle is defined as a +X-axis direction, and a leftward direction when facing the forward direction of the vehicle is defined as a −X-axis direction. Here, the "forward direction" means a traveling direction of the vehicle when traveling forward. Namely, the "forward direction" is a direction in which the headlight emits light. Further, the upward/downward direction of the vehicle is defined as a Y-axis direction. The upward direction is defined as a +Y-axis direction, and the downward direction is defined as a −Y-axis direction. The "upward direction" is the direction of the sky, and the "downward direction" is the direction of the ground (i.e., towards the road surface). Furthermore, the traveling direction of the vehicle is defined as a Z-axis direction. The traveling direction of the vehicle when traveling forward is defined as a +Z-axis direction, and the opposite direction is defined as a −Z-axis direction. The +Z-axis direction is referred to as the "forward direction", and the −Z-axis direction is referred to as a "backward direction", The +Z-axis direction is the direction in which the headlight module mounted on the vehicle emits light.

A ZX plane is a plane parallel to the road surface. Normally, the road surface can be regarded as a "horizontal plane". Thus, the ZX plane is referred to also as the "horizontal plane". The "horizontal plane" is a plane orthogonal to the direction of the gravitational force. However, there are cases where the road surface is inclined with respect to the traveling direction of the vehicle. Namely, the road surface is inclined with respect to the horizontal plane at an upward slope, a downward slope or the like. In such cases, the "horizontal plane" is regarded as a plane parallel to the road surface. Namely, in such cases, the "horizontal plane" is regarded as not being a plane orthogonal to the direction of the gravitational force.

On the other hand, it is rare that an ordinary road surface is inclined in the left-right direction with respect to the traveling direction of the vehicle. The "left-right direction" is a width direction of the lane. In such cases, the "horizontal plane" is regarded as a plane orthogonal to the gravitational direction. For example, even if the road surface is inclined in the left-right direction and the vehicle is orthogonal to the left-right direction of the road surface, the condition is considered to be equivalent to a condition in which the vehicle is inclined in the left-right direction with respect to the "horizontal plane".

To facilitate the understanding, the following description will be given while regarding the "horizontal plane" as a plane orthogonal to the gravitational direction. Namely, the description will be given while regarding the ZX plane as a plane orthogonal to the gravitational direction.

As the light source of the headlight module, a tube/bulb light source such as an incandescent lamp, a halogen lamp or a fluorescent lamp may be used, for example. Further, a semiconductor light source such as a light-emitting diode (LED) or a laser diode. (LD) may be used as the light source, for example. Namely, the light source is not particularly limited and any type of light source may be used. However, from the viewpoint of lightening the load on the environment such as reducing carbon dioxide ($CO_2$) emission and fuel consumption, it is desirable to employ a semiconductor light source as the light source. Employing the semiconductor light source is desirable from the viewpoint that the semiconductor light source has higher luminous efficiency compared to lamp light sources as typified by conventional halogen bulbs and downsizing and weight reduction are easy. The semiconductor light source has higher directivity compared to conventional lamp light sources and enables downsizing and weight reduction of the optical system.

Further, the "light distribution pattern" indicates the shape of a light flux and light intensity distribution that result from directions of light radiated from the light source. The "light distribution pattern" is used also in the meaning of the illuminance distribution pattern on an illuminated surface (e.g., illuminated surface 9 shown in FIG. 4, FIG. 6, etc. which will be explained later). Furthermore, the "light distribution" is the light intensity distribution with respect to the directions of the light radiated from the light source. The "light distribution" is used also in the meaning of the illuminance distribution on the illuminated surface.

The headlight module in the present disclosure is employed for the low beam, the high beam, etc. of the headlight device for a vehicle. Further, the headlight module in the present disclosure is employed also for the low beam, the high beam, etc. of the headlight device for a motorcycle. Furthermore, the headlight module in the present disclosure is employed also for the low beam, the high beam, etc. of the headlight device for a different type of vehicle such as a three-wheeled or four-wheeled vehicle.

The following description will be given by taking examples of cases of forming the light distribution pattern of the low beam of the headlight for a motorcycle. In the light distribution pattern of the low beam of the headlight for a motorcycle, the cutoff line extends in the left-right direction (the x-axis direction) of the vehicle, and the region inside the light distribution pattern and slightly below the cutoff line is the brightest.

As the three-wheeled vehicle, a motor tricycle called a Gyro can be taken as an example. The "motor tricycle called a Gyro" is a scooter with three wheels including one front wheel and uniaxial two rear wheels. In Japan, the motor tricycle is categorized under motorized bicycles. The motor tricycle has a rotation axis in the vicinity of the center of the vehicle body and most of the vehicle body including the front wheel and the driver seat can be tilted in the left-right direction. With this mechanism, similarly to the motorcycle, the motor tricycle is capable of shifting its barycenter inward at times of turning.

First Embodiment

<General Outline of Headlight Module 100>

Figure 1B:
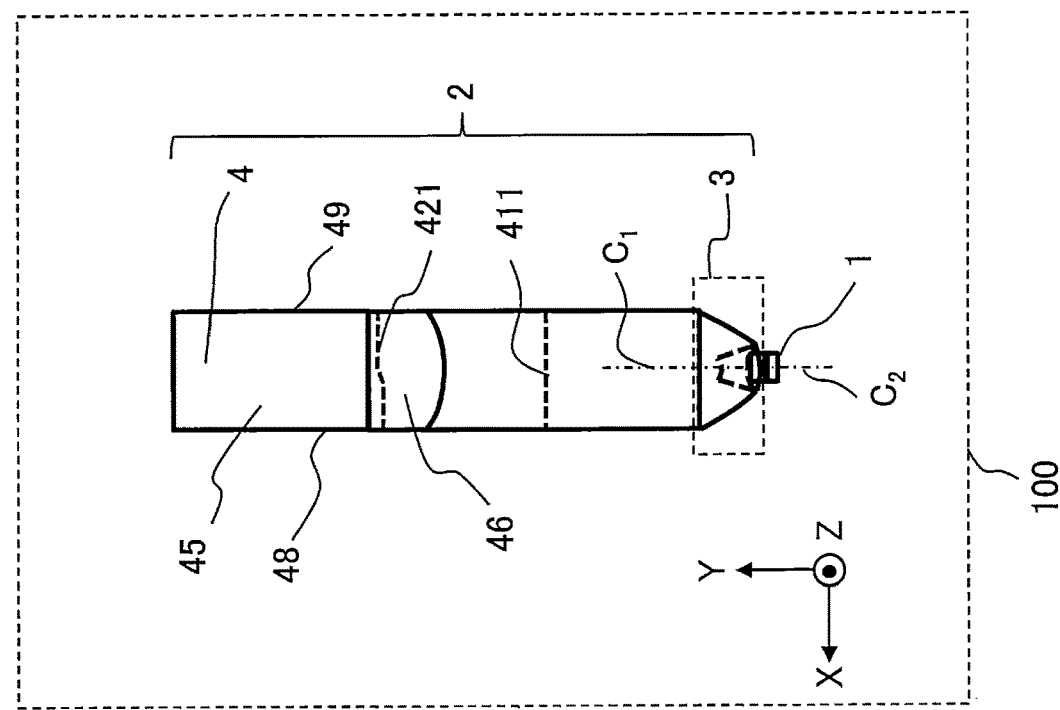

FIG. 1A and FIG. 18 are diagrams showing the configuration of a headlight module 100 according to a first embodiment. The headlight module 100 is a device for a vehicle. FIG. 1A is a diagram showing the headlight module 100 as viewed from the right-hand side when facing the forward direction of the vehicle. FIG. 18 is a diagram showing the headlight module 100 as viewed from above. As shown in FIG. 1A and FIG. 1B, the headlight module 100 according to a first embodiment includes a light source 1 and a light guide projection optical element 2. The light guide projection optical element 2 includes a condensing optical unit 3 and a light guide member 4. While the condensing optical unit 3 and the light guide member 4 may be implemented as an integrated member, the condensing optical unit 3 and the light guide member 4 may also be implemented as a combination of Separate members.

The condensing optical unit 3 is an optical member that allows light generated by the light source 1 to enter and transforms the light into condensed light. The condensed light enters the light guide member 4. The light guide member 4 is an optical member formed of a light-permeable material. The light guide member 4 includes a first reflecting surface 41, a second reflecting surface 42, a third reflecting surface 43, a fourth reflecting surface 44, a first cutoff line formation part 411, a second cutoff line formation part 421, a first emission surface 45 and a second emission surface 46. While the first to fourth reflecting surfaces 41 to 44 are desired to be total reflection surfaces, the first to fourth reflecting surfaces 41 to 44 may also be mirror surfaces formed by metal vapor deposition or the like. While only the fourth reflecting surface 44 has a mirror surface in the illustrated example, the first to fourth reflecting surfaces 41 to 44 are not limited to such a configuration. However, it is desirable to make the first to fourth reflecting surfaces 41 to 44 of the light guide member 4 function as total reflection surfaces. That is because a total reflection surface has higher reflectance than a mirror surface and contributes to improvement in light utilization efficiency. Further, that is because eliminating the mirror vapor deposition process can simplify the manufacturing process of the light guide member 4 and that contributes to reduction in the manufacturing cost of the light guide member 4.

For example, the first cutoff line formation part 411 is formed to adjoin the first reflecting surface 41, and the second cutoff line formation part 421 is formed to adjoin the second reflecting surface 42. For example, the third reflecting surface 43 is a surface corresponding to the first cutoff line formation part 411, and the fourth reflecting surface 44 is a surface corresponding to the second cutoff line formation part 421. The third reflecting surface 43 has its focal position in the vicinity of the first cutoff line formation part 411 and points part of light after passing through the vicinity of the first cutoff line formation part 411, as part of the entered condensed light, in a direction in which the first emission surface 45 is situated. The fourth reflecting surface 44 is arranged at a position closer to the light source 1 than the third reflecting surface 43 and points part of the entered condensed light in a direction in which the second reflecting surface 42, the second cutoff line formation part 421 and the second emission surface 46 are situated.

Figure 5:
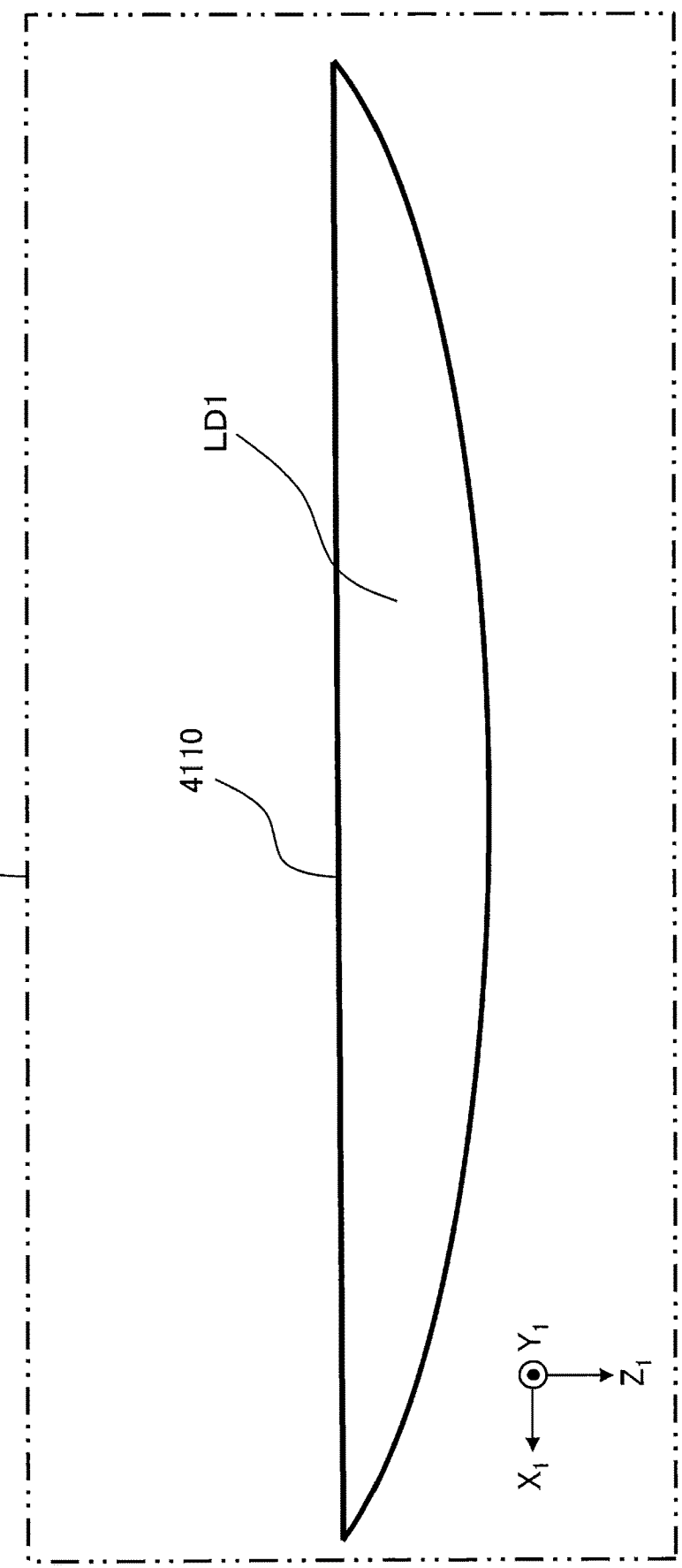
FIG. 5 is a diagram showing a first light distribution pattern formed on a first plane of the light guide member of the headlight module according to the first embodiment.

The first cutoff line formation part 411 forms light in a first light distribution pattern LD1 (an example is shown in FIG. 5 which will be explained later) from the condensed light. The first light distribution pattern LD1 has a first cutoff line corresponding to the shape of the first cutoff line formation part 411.

Figure 7:
FIG. 7 is a diagram showing a second light distribution pattern formed on a second plane of the light guide member of the headlight module according to the first embodiment.

The second cutoff line formation part 421 forms light in a second light distribution pattern LD2 (an example is shown in FIG. 7 which will be explained later) from the condensed light. The second light distribution pattern LD2 has a second cutoff line 4210 corresponding to the shape of the second cutoff line formation part 421. The second cutoff line 4210 corresponding to the shape of the second cutoff line formation part 421 is a line in the stepped shape including the rising line.

Figure 8:
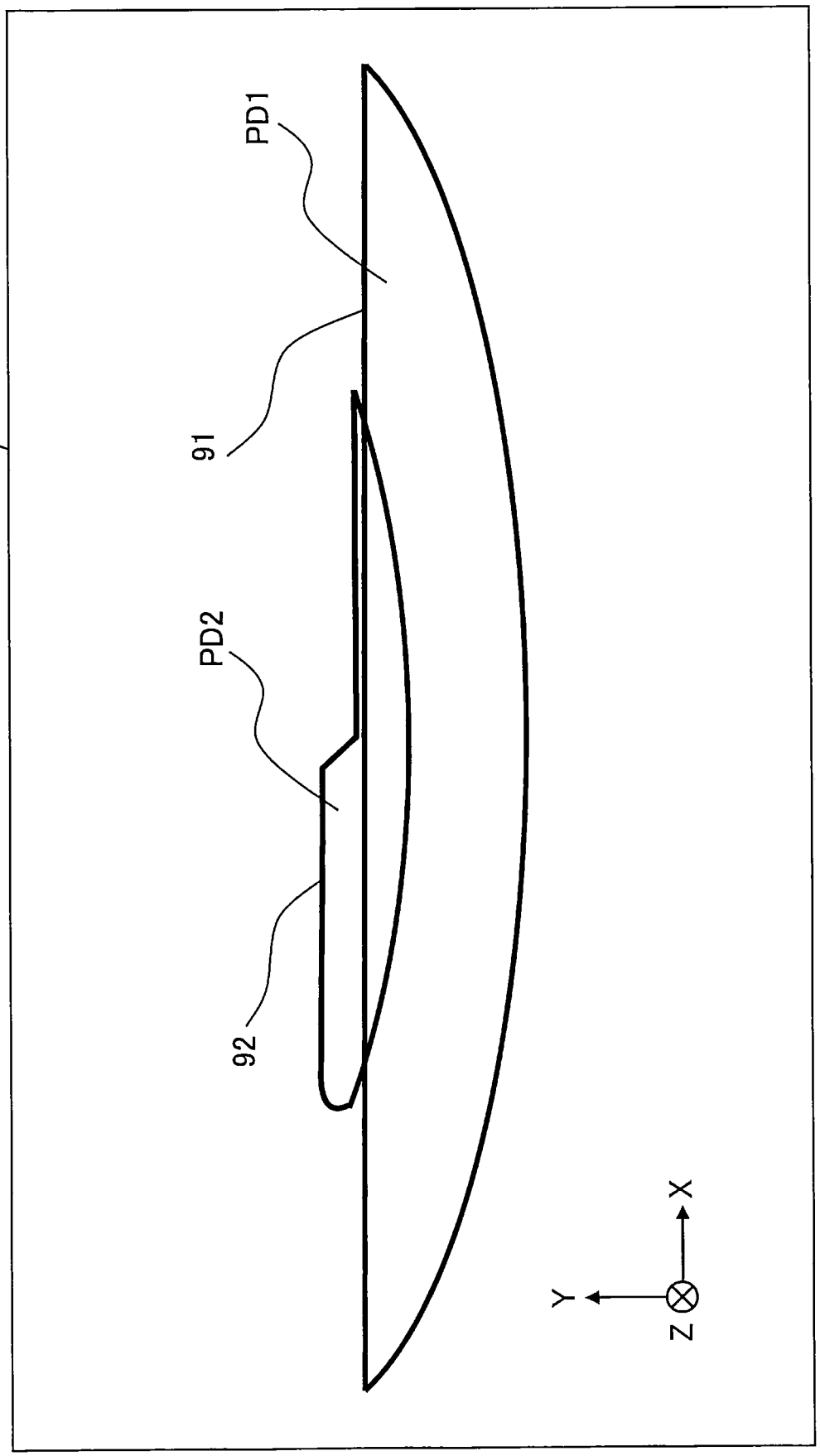
FIG. 8 is a diagram showing a combined illuminance distribution pattern of light emitted from the headlight module according to the first embodiment.

The first emission surface 45 emits light in a first illuminance distribution pattern PD1 (an example is shown in FIG. 8 which will be explained later) corresponding to the first light distribution pattern LD1. The first illuminance distribution pattern PD1 has a third cutoff line 91 corresponding to the shape of the first cutoff line formation part 411.

The second emission surface 46 emits light in a second illuminance distribution pattern PD2 (an example is shown in FIG. 8 which will be explained later) corresponding to the second light distribution pattern LD2. The second illuminance distribution pattern PD2 has a fourth cutoff line 92 corresponding to the shape of the second cutoff line formation part 421.

Light in a combined illuminance distribution pattern (an example is shown in FIG. 8 which will be explained later), obtained by adding light in the first illuminance distribution pattern PD1 emitted from the first emission surface 45 and the light in the second illuminance distribution pattern PD2 emitted from the second emission surface 46, is applied to the illuminated surface 9.

<Light Source 1>

As shown in FIG. 1A and FIG. 1B, an optical axis of the light source 1 and an optical axis $C_1$ of the condensing optical unit 3 are arranged to be inclined in the +Z-axis direction from the Y-axis direction by an angle α. While the angle α may be set at 0 degrees, the light utilization efficiency increases if the optical axes are inclined (i.e., the angle α is larger than 0 degrees). To "incline the optical axis in the +Z-axis direction" means to rotate the optical axis $C_1$, originally parallel to the Y-axis, around the X-axis as the rotation axis clockwise as viewed from a position in the +X-axis direction.

To facilitate the description of the light source 1 and the light guide projection optical element 2, $X_1Y_1Z_1$ coordinates are also used as a new coordinate system. The $X_1Y_1Z_1$ coordinates are coordinates obtained by rotating the XYZ coordinates around the X-axis as the rotation axis clockwise by the angle α as viewed from a position in the +X-axis direction. Incidentally, in the first embodiment, the optical axis $C_1$ of the condensing optical unit 3 is parallel to the $Y_1$-axis. Further, the optical axis $C_1$ of the condensing optical unit 3 coincides with the optical axis $C_2$ of the light source 1.

The light source 1 has a light-emitting surface 11. The light source 1 emits light, for illuminating a region in the forward direction from the vehicle, from the light-emitting surface 11. The light source 1 is situated in the $-Y_1$-axis direction from the light guide projection optical element 2. For example, in FIG. 1A and FIG. 1B, the light source 1 emits the light in the $+Y_1$-axis direction. The light source 1 is a light source employing an LED, for example. The LED emits light in Lambert light distribution. The "Lambert distribution" is light distribution in which the luminance of the light-emitting surface is constant irrespective of the direction of viewing. In other words, the directivity of the LED's light distribution is wide. Therefore, reducing a distance between the light source 1 and the condensing optical unit 3 makes it possible to have a greater amount of light enter the light guide member 4. However, the light source 1 is not limited to a light source employing an LED.

<Light Guide Projection Optical Element 2>

Figure 3:
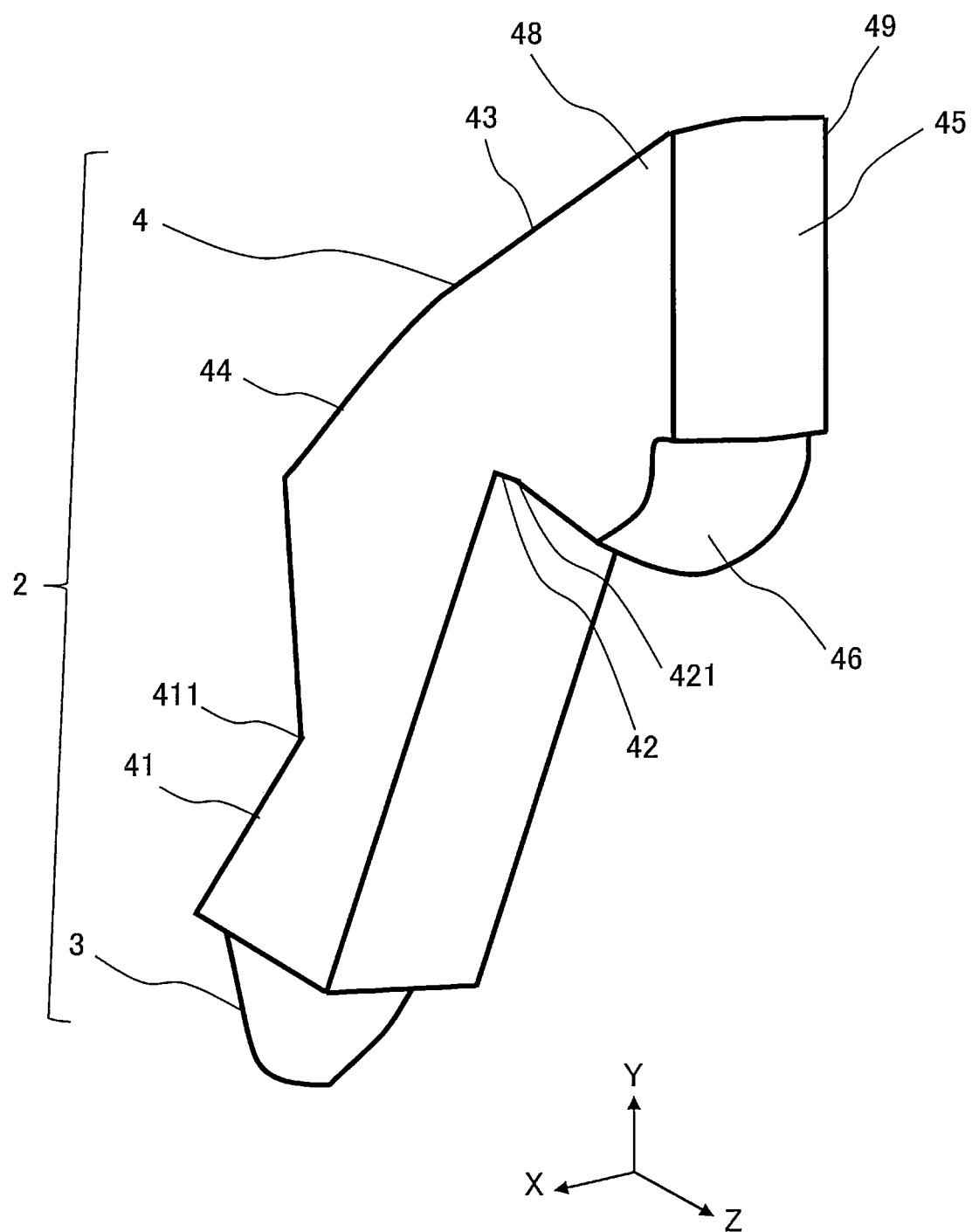
FIG. 3 is a schematic perspective view showing a configuration of a light guide projection optical element of the headlight module according to the first embodiment.

FIG. 2A to FIG. 2C are a side view, a front view and a top view showing the configuration of the light guide member 4 of the light guide projection optical element 2 of the headlight module 100 according to the first embodiment. FIG. 3 is a schematic perspective view Showing the configuration of the light guide projection optical element 2 of the headlight module 100 according to the first embodiment.

The light guide projection optical element 2 is arranged in the $+Y_1$-axis direction from the light source 1. Further, the light guide projection optical element 2 is filled in with a refractive material, for example. The light guide projection optical element 2 is made of transparent resin, glass or silicone material, for example. The material of the light guide projection optical element 2 is not limited as long as the material has light permeability; even transparent resin or the like is usable. From the viewpoint of the light utilization efficiency, the material of the light guide projection optical element 2 is desired to be a material having high light permeability. Further, since the light guide projection optical element 2 is arranged in close proximity to the light source 1, the material of the light guide projection optical element 2 is desired to be a material excelling in heat resistance, <Condensing Optical Unit 3>

The condensing optical unit 3 allows the light emitted from the light source 1 to enter and condenses the light at a position in front (in the $+Y_1$-axis direction). The condensing optical unit 3 is an optical element having the following functions, for example: The condensing optical unit 3 condenses a light beam having a small emission angle emitted from the light source 1 at a position inside the light guide member 4 by refraction. Further, for example, the condensing optical unit 3 condenses a light beam having a large emission angle emitted from the light source 1 at a position inside the light guide member 4 by reflection. The condensing optical unit 3 has positive power as a whole. The condensing optical unit 3 is a condensing optical element having the light condensing function. A concrete example of the condensing optical unit 3 will be described in a second embodiment.

The light condensed by the condensing optical unit 3 travels in the light guide member 4 and is emitted in the forward direction (+Z-axis direction) from the first emission surface 45 or the second emission surface 46 of the light guide member 4. Optical paths of the light emitted from the first emission surface 45 and optical paths of the light emitted from the second emission surface 46 will be respectively described below.

<Optical Paths of Rays R1 to R3 Emitted from First Emission Surface 45>

Figure 4:
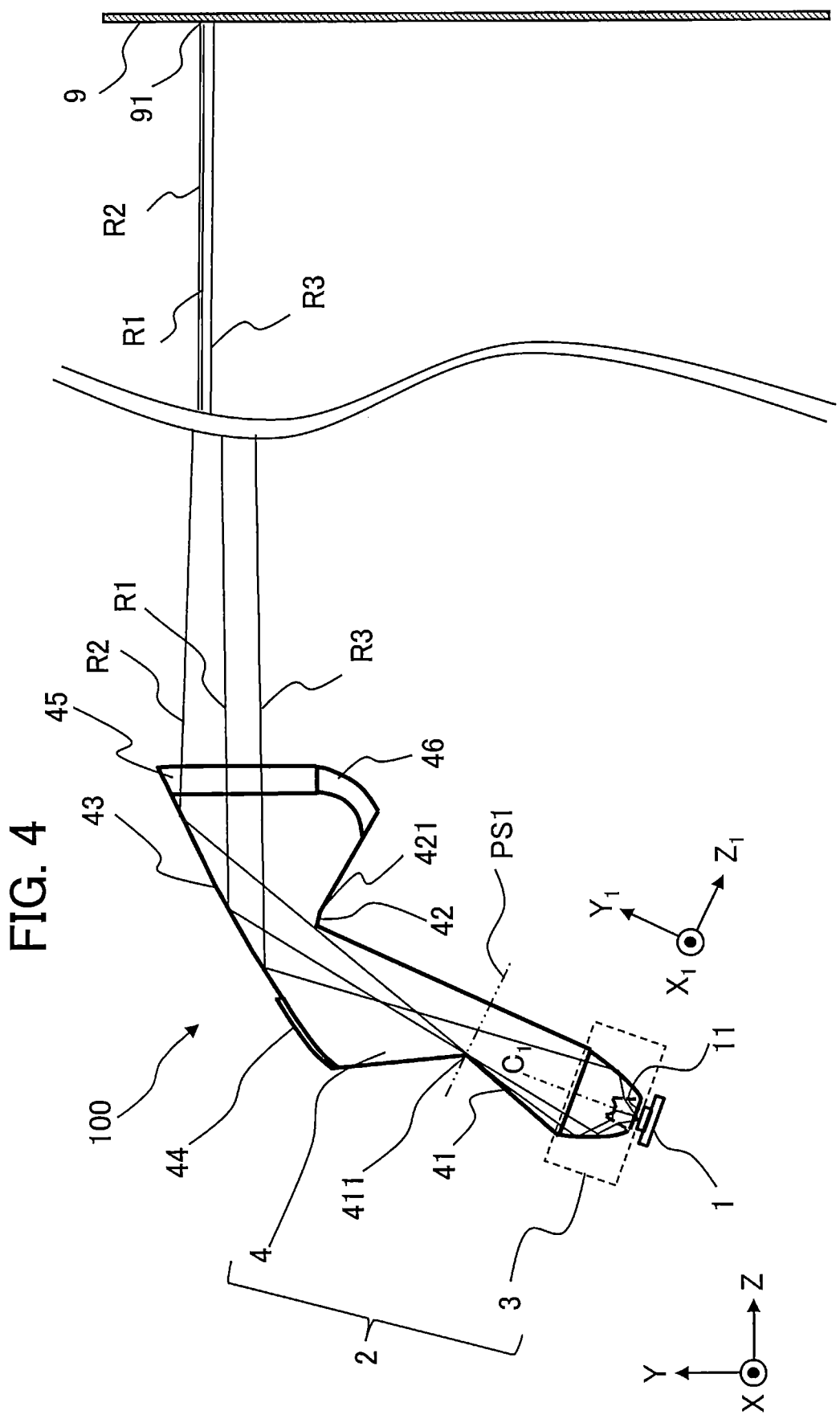
FIG. 4 is a diagram showing optical paths of light emitted from a first emission surface of the light guide member of the headlight module according to the first embodiment.

FIG. 4 is a diagram showing optical paths of the light emitted from the first emission surface 45 of the light guide member 4 included in the light condensed by the condensing optical unit 3. The light condensed by the condensing optical unit 3 is condensed at a position in the +Y-axis direction in the vicinity of the first cutoff line formation part 411, for example. Further, part of the light to be condensed at the position in the vicinity of the first cutoff line formation part 411 is reflected by the first reflecting surface 41.

The first reflecting surface 41 is formed on a plane connecting an end part of the light guide member 4 on the condensing optical unit 3's side and the first cutoff line formation part 411, for example. Further, the first reflecting surface 41 is not limited to a plane but can also be a curved surface having the light condensing function.

In the light condensed at the position in the vicinity of the first cutoff line formation part 411, part of the light reflected by the first reflecting surface 41 and part of light not reflected by the first reflecting surface 41 travel towards the third reflecting surface 43 and are reflected by the third reflecting surface 43. A surface shape of the third reflecting surface 43 corresponding to the vertical direction (Y-axis direction) is a concave surface Namely, surface curvature of the third reflecting surface 43 corresponding to the vertical direction (Y-axis direction) has positive power. Further, the surface curvature of the third reflecting surface 43 corresponding to the vertical direction (Y-axis direction) is in a shape having its focal position in the vicinity of the first cutoff line formation part 411.

The light reflected by the third reflecting surface 43 is emitted in the forward direction (+Z-axis direction) by the first emission surface 45. The first emission surface 45 forms a cylindrical lens having curvature only in a horizontal direction (X-axis direction), for example. However, the first emission surface 45 may also form a lens having curvature in both of the X-axis direction and the Y-axis direction.

A ray R1 shown in FIG. 4 is condensed by the condensing optical unit 3 to skirt the vicinity of the first cutoff line formation part 411. The ray R1 that passed through a first plane PS1 parallel to the light-emitting surface 11 (i.e., orthogonal to the optical axis $C_1$) and including the first cutoff line formation part 411 is reflected by the third reflecting surface 43 and is emitted by the first emission surface 45. The ray R1 emitted from the first emission surface 45 is applied to the illuminated surface 9.

Here, the illuminated surface 9 is in a conjugate relationship with the first plane PS1 in regard to the vertical direction. Namely, a linear shape of the first cutoff line formation part 411 in the horizontal direction (i.e., the shape of the first cutoff line 4110 of the first light distribution pattern LD1) corresponds to a linear shape of the third cutoff line 91 of the first illuminance distribution pattern PD1 in the horizontal direction on the illuminated surface 9. Namely, the ray R1 after traveling to skirt the first cutoff line formation part 411, being reflected by the third reflecting surface 43 and being emitted from the first emission surface 45 is applied to the position of the third cutoff line 91 on the illuminated surface 9.

A ray R2 shown in FIG. 4 is a ray as light condensed by the condensing optical unit 3, reflected by the first reflecting surface 41, and condensed in the vicinity of the first cutoff line formation part 411. The ray R2 condensed in the vicinity of the first cutoff line formation part 411 is reflected by the third reflecting surface 43 similarly to the ray R1, emitted from the first emission surface 45, and applied to a position on the illuminated surface 9 in the vicinity of the third cutoff line 91.

A ray R3 shown in FIG. 4 is condensed by the condensing optical unit 3 similarly to the ray R1, reflected by the third reflecting surface 43, and emitted in the forward direction by the first emission surface 45. On the first plane PS1, the ray R3 is condensed at a position farther from the first cutoff line formation part 411 in the $+Z_1$-axis direction compared to the ray R1, and thus also on the illuminated surface 9, the ray R3 is applied to a position farther from the third cutoff line 91 in the −Y-axis direction compared to the ray R1.

Namely, due to the light emitted from the first emission surface 45 included in the light condensed by the condensing optical unit 3, the first cutoff line 4110 in the linear shape formed by the first cutoff line formation part 411 is projected onto the illuminated surface 9 as the third cutoff line 91 since the illuminated surface 9 and the first plane PS1 are in the conjugate relationship in regard to the Y-axis direction.

FIG. 5 is a diagram showing the first light distribution pattern LD1 as the light distribution pattern of the light emitted from the first emission surface 45 of the light guide member 4 of the headlight module 100. FIG. 5 shows the first light distribution pattern LD1 formed on the first plane PS1. The first light distribution pattern LD1 having the first cutoff line 4110 in the linear shape extending in the $X_1$-axis direction is formed by the first cutoff line formation part 411's ridge line in a linear shape (e.g., straight line in the X-axis direction).

Namely, by the first cutoff line formation part 411, the light emitted from the first emission surface 45 included in the light condensed by the condensing optical unit 3 is enabled to have a shape corresponding to the first light distribution pattern LD1 having the first cutoff line 4110 in the linear shape.

Incidentally, the ridge line of the first cutoff line formation part 411 does not necessarily have to be in the linear shape. The ridge line of the first cutoff line formation part 411 may also be formed in a shape other than the linear shape, such as a curved line shape, in consideration of influence of aberration caused by the third reflecting surface 43 or the like.

Further, the light in the first light distribution pattern LD1 on the first plane PS1 formed by the first cutoff line formation part 411 is applied by the first emission surface 45 to the illuminated surface 9 as the light in the first illuminance distribution pattern PD1 without being inverted in the upward/downward direction.

Here, the illuminated surface 9 is a virtual surface that is set at a prescribed position in the forward direction from the vehicle. The illuminated surface 9 is a surface parallel to the XX plane. The prescribed position in the forward direction from the vehicle is a position where the luminosity or the illuminance of the headlight module is measured, which is stipulated by the road traffic rules or the like. For example, in Europe, the luminosity measurement position for automobile headlight devices stipulated by UNECE (United Nations Economic Commission for Europe) is a position 25 meters from the light source. In Japan, the luminosity measurement position stipulated by Japanese Industrial Standards Committee (JIS) is a position 10 meters from the light source.

<Optical Paths of Rays R4 and R5 Emitted from Second Emission Surface 46>

Figure 6:
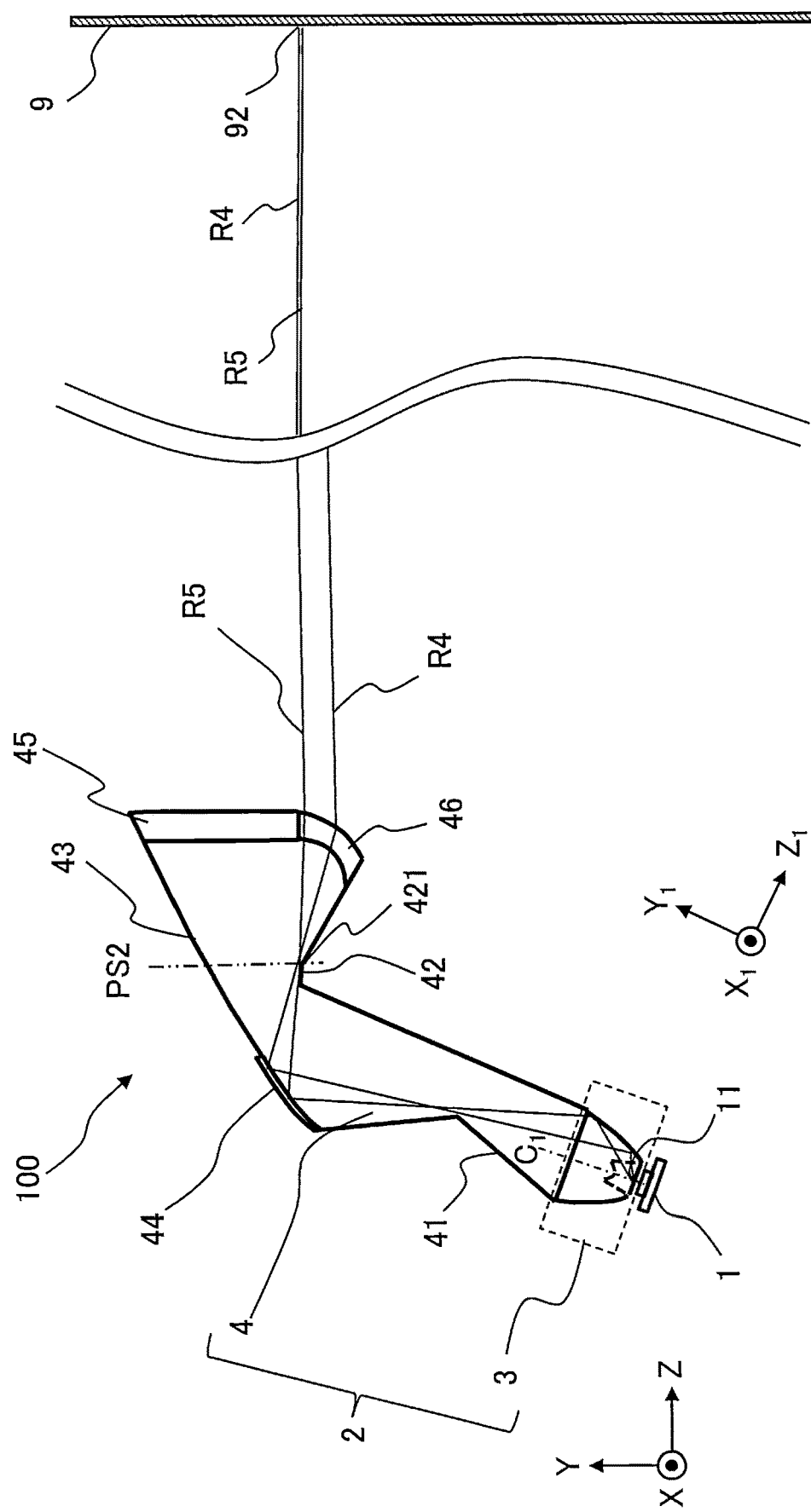
FIG. 6 is a diagram showing optical paths of light emitted from a second emission surface of the light guide member of the headlight module according to the first embodiment.

FIG. 6 is a diagram showing optical paths of the light emitted from the second emission surface 46 of the light guide member 4 of the headlight module 100 according to the first embodiment. FIG. 6 shows optical paths of the light emitted from the second emission surface 46 included in the light condensed by the condensing optical unit 3. Part of the light condensed by the condensing optical unit 3 directly arrives at the fourth reflecting surface 44 without being reflected by the first reflecting surface 41.

The fourth reflecting surface 44 is situated on the +Y-axis direction side relative to the first reflecting surface 41 and situated on the −Z-axis direction side relative to the third reflecting surface 43. The fourth reflecting surface 44 is, for example, in a curved surface Shape having a function of reflecting incident light and condensing the light in the vicinity of the second cutoff line formation part 421. Namely, the fourth reflecting surface 44 is desired to have positive power.

The light reflected and condensed in the vicinity of the second cutoff line formation part 421 by the fourth reflecting surface 44 is emitted in the forward direction (i.e., the +Z-axis direction) by the second emission surface 46. Further, part of the light condensed in the vicinity of the second cutoff line formation part 421 is reflected by the second reflecting surface 42 and emitted in the forward direction (i.e., the +Z-axis direction) by the second emission surface 46.

The second emission surface 46 is a lens surface in a convex shape with curvature to have its focal position in the second cutoff line formation part 421. Namely, the illuminated surface 9 and a second plane PS2 including the second cutoff line formation part 421 are in the conjugate relationship. Therefore, the second emission surface 46 projects light in the second illuminance distribution pattern PD2, corresponding to the second light distribution pattern LD2 formed on the second plane PS2, onto the illuminated surface 9.

In other words, as shown in FIG. 6, a ray R4 is condensed by the condensing optical unit 3 and arrives at the fourth reflecting surface 44. The ray R4 after arriving at the fourth reflecting surface 44 passes through the second plane PS2 to skirt the vicinity of the second cutoff line formation part 421 and is emitted by the second emission surface 46. The ray R4 emitted by the second emission surface 46 is applied to the illuminated surface 9.

Here, the illuminated surface 9 is in the conjugate relationship with the second plane PS2. Therefore, the shape of the second cutoff line formation part 421 corresponds to the shape of the fourth cutoff line 92 on the illuminated surface 9. Namely, the ray R4 after being reflected by the fourth reflecting surface 44, traveling to skirt the second cutoff line formation part 421 and being emitted from the second emission surface 46 is applied to the position of the fourth cutoff line 92 on the illuminated surface 9.

A ray R5 shown in FIG. 6 is condensed by the condensing optical unit 3 and arrives at the fourth reflecting surface 44. The ray R5 after arriving at the fourth reflecting surface 44 is reflected by the second reflecting surface 42 connecting to the second cutoff line formation part 421 and extending in the −Z-axis direction further than the second cutoff line formation part 421, passes through the second plane PS2 so as to skirt the vicinity of the second cutoff line formation part 421, and is emitted by the second emission surface 46. The ray R5 emitted by the second emission surface 46 is applied to the position of the fourth cutoff line 92 on the illuminated surface 9 similarly to the ray R4.

Namely, due to the light emitted from the second emission surface 46 included in the light condensed by the condensing optical unit 3, the second cutoff line 4210 of the second light distribution pattern LD2 formed by the second cutoff line formation part 421 is projected onto the illuminated surface 9 as the fourth cutoff line 92 of the second illuminance distribution pattern PD2 since the illuminated surface 9 and the second plane PS2 are in the conjugate relationship.

Incidentally, the first cutoff line formation part 411 formed the linear-shaped first cutoff line 4110 of the first light distribution pattern LD1 and the linear-shaped third cutoff line 91 of the first illuminance distribution pattern POI. In contrast, the second cutoff line formation part 421 is capable of forming a cutoff line in the stepped shape since the illuminated surface 9 and the second plane PS2 are in the conjugate relationship. Namely, the cutoff line in the stepped shape required of the low beam for an automobile can be formed.

FIG. 7 shows an example of the second light distribution pattern LD2 formed on the second plane PS2. The second cutoff line formation part 421 is in a stepped shape made up of a first ridge line part 421A, a second ridge line part 421B and a third ridge line part 421C. By the second cutoff line formation part 421 having this stepped shape, the second light distribution pattern LD2 having the second cutoff line 4210 in the stepped shape is formed. The second cutoff line 4210 in the stepped shape includes a first ridge line part 421A, a third ridge line part 421C, and a second ridge line part 4218 connecting an end part of the first ridge line part 421A and an end part of the third ridge line part 421C to each other and being inclined with respect to the first ridge line part 421A and the third ridge line part 421C. While the first ridge line part 421A and the third ridge line part 421C are normally parallel to each other in the example of FIG. 7, they do not need to be parallel to each other.

To sum up, the light emitted from the second emission surface 46 included in the light condensed by the condensing optical unit 3 can form light in the second illuminance distribution pattern PD2 having the fourth cutoff line 92 in the shape (e.g., the stepped shape) corresponding to the shape of the second cutoff line formation part 421.

Incidentally, the second light distribution pattern LD2 on the second plane PS2 formed by the second cutoff line formation part 421 is projected by the second emission surface 46 onto the illuminated surface 9 while being inverted in the upward/downward direction and the left-right direction. Parenthetically, the surface projected by the second emission surface 46 does not necessarily have to be the second plane PS2; the second emission surface 46 may also project a surface in a curved surface shape onto the illuminated surface 9 in consideration of influence of aberration or the like.

<First Illuminance Distribution Pattern PD1, Second Illuminance Distribution Pattern PD2>

In the low beam of the headlight device including the headlight module, the cutoff line is in the stepped shape including the rising line.

A vertical direction on the first plane PS1 of the light guide member 4 (i.e., the $Z_1$-axis direction) is in the optically conjugate relationship with respect to a vertical direction of the illuminated surface 9 (i.e., the Z-axis direction). Namely, the first light distribution pattern LD1 having the linear-shaped ridge line of the first cutoff line formation part 411 corresponds to the first illuminance distribution pattern PD1 having the linear-shaped third cutoff line 91 on the illuminated surface 9.

The second plane PS2 of the light guide member 4 and the illuminated surface 9 are in the optically conjugate relationship. Namely, the second light distribution pattern LD2 having the stepped-shaped ridge line of the second cutoff line formation part 421 corresponds to the second illuminance distribution pattern PD2 having the stepped-shaped fourth cutoff line 92 on the illuminated surface 9.

To sum up, as schematically shown in FIG. 8, the light emitted by the headlight module 100 according to the first embodiment is light in the combined illuminance distribution pattern obtained by adding the light in the first illuminance distribution pattern PD1 and the light in the second illuminance distribution pattern PD2.

Figure 9:
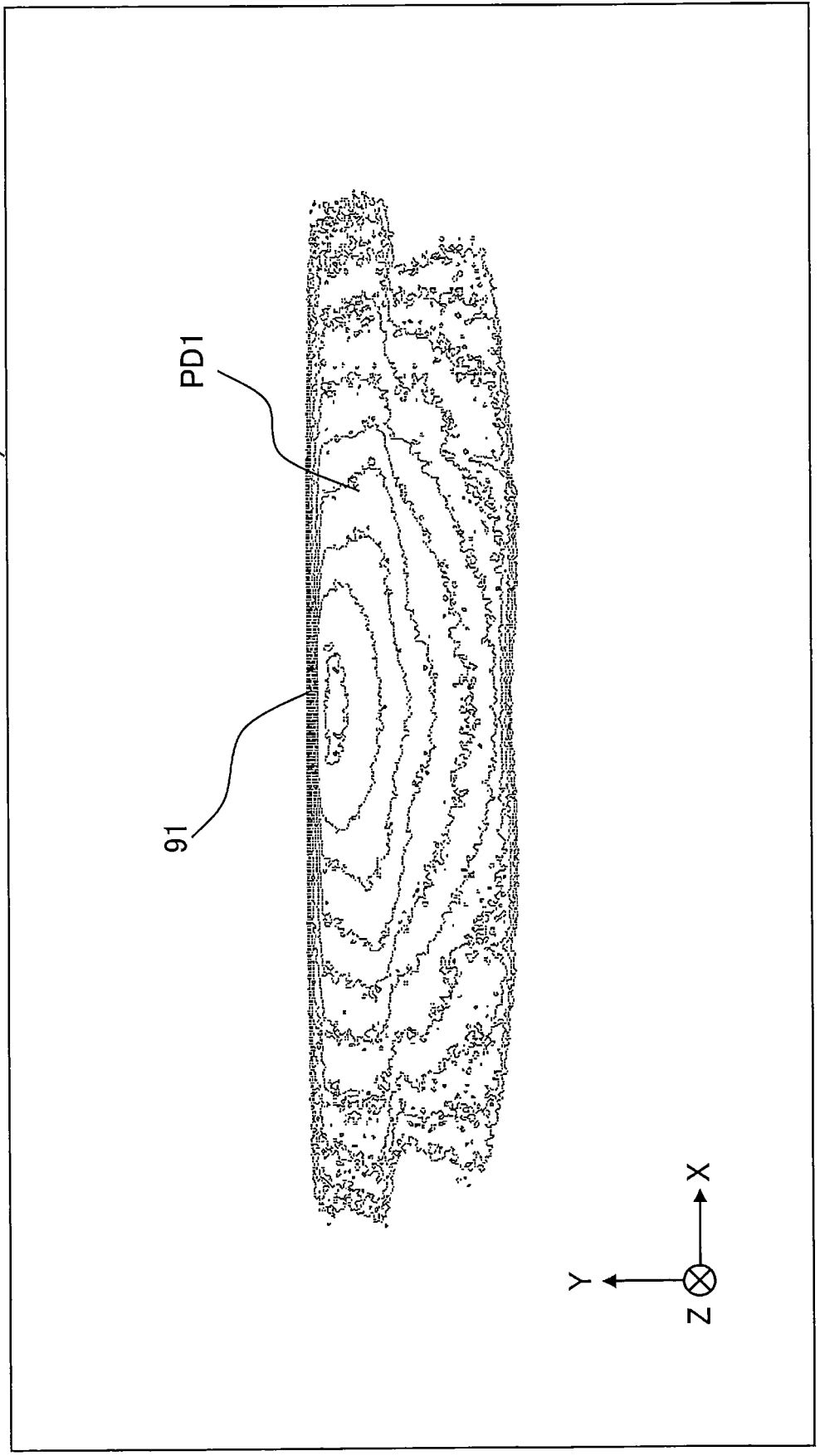
FIG. 9 is a diagram showing an illuminance distribution pattern of the light emitted from the first emission surface of the light guide member of the headlight module according to the first embodiment in contour display.

Further, broadening of the light in the first illuminance distribution pattern PD1 in the horizontal direction (i.e., the X-axis direction) is desired to be set wider than broadening of the light in the second illuminance distribution pattern PD2 in the horizontal direction. This is because the light in the first illuminance distribution pattern PD1 can be broadened while holding down a decrease in the light utilization efficiency by adjusting horizontal direction curvature of the first emission surface 45 which corresponds to the light in the first illuminance distribution pattern PD1, FIG. 9 is a diagram showing the illuminance distribution of the first illuminance distribution pattern PD1 of the headlight module 100 according to the first embodiment in contour display. This is illuminance distribution projected on the illuminated surface 9 that is 25 meters ahead (i.e., in the +Z-axis direction). This illuminance distribution is obtained by simulation. The "contour display" means displaying in a contour diagram. The "contour diagram" means a diagram in which points having the same value are connected by lines. As is clear from FIG. 9, the linear-shaped third cutoff line 91 of the first illuminance distribution pattern PD1 is projected distinctly.

Figure 10:
FIG. 10 is a diagram showing an illuminance distribution pattern of the light emitted from the second emission surface of the light guide member of the headlight module according to the first embodiment in contour display.

FIG. 10 is a diagram showing the illuminance distribution of the second illuminance distribution pattern PD2 of the headlight module 100 according to the first embodiment in contour display. As is clear from FIG. 10, the stepped-shaped fourth cutoff line 92 of the second illuminance distribution pattern PD2 is projected distinctly.

Figure 11:
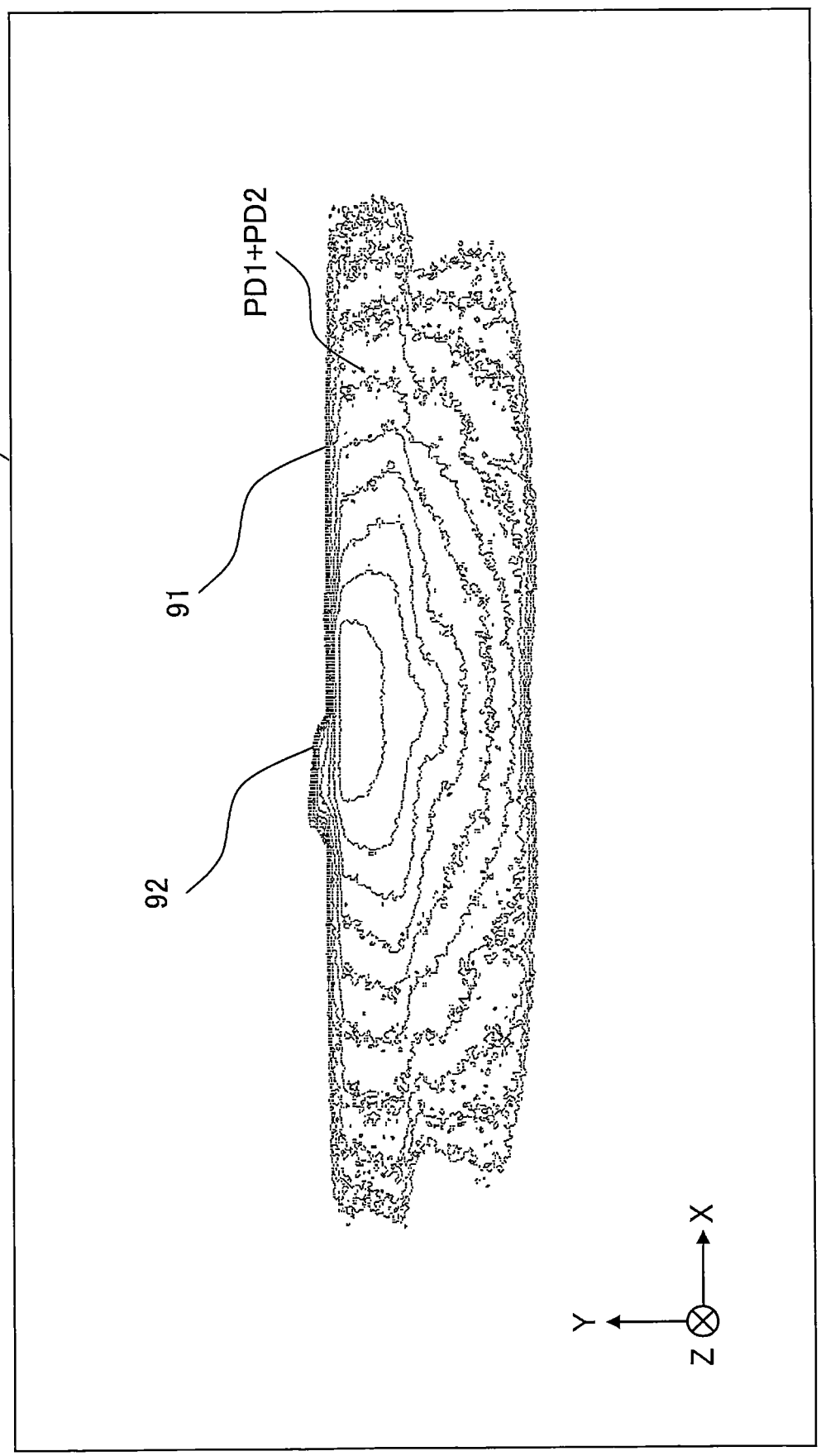
FIG. 11 is a diagram showing the combined illuminance distribution pattern of the light emitted from the light guide member of the headlight module according to the first embodiment in contour display.

FIG. 11 is a diagram showing the illuminance distribution of the combined illuminance distribution pattern of the headlight module 100 according to the first embodiment obtained by superimposing the light in the first illuminance distribution pattern PD1 and the light in the second illuminance distribution pattern PD2 together in contour display. In the combined illuminance distribution pattern shown in FIG. 11, the cutoff lines are projected distinctly. Further, a light distribution pattern with less light distribution irregularity is realized.

It is clear from FIG. 9 and FIG. 10 that the first illuminance distribution pattern PD1 successfully forms a wider light distribution pattern compared to the second illuminance distribution pattern PD2.

<Effect>

In the headlight module 100 according to the first embodiment, the light guide member 4's opening shape is an opening shape that is vertically long in the vertical direction (i.e., the Y-axis direction). Namely, the first emission surface 45 and the second emission surface 46 of the light guide member 4 form one integrated lens in which the surfaces 45 and 46 are arranged in tandem in the vertical direction (i.e., arrangement direction) as the Y-axis direction. Therefore, the headlight module 100 is capable of realizing a headlight device with high designability having a vertically long opening shape being long in the vertical direction which has been difficult to realize so fax.

In the headlight module 100 according to the first embodiment, the light guide member 4 is described to be formed integrally with the condensing optical unit 3. However, the configuration of the light guide member 4 is not limited to this configuration; the condensing optical unit 3 may be formed as a separate component. Such a configuration has an advantage in that the shape of the light guide member 4 does not need to be complicated and the productivity increases. However, in the case where the condensing optical unit 3 and the light guide member 4 are formed with separate members, the light utilization efficiency decreases compared to the case where the condensing optical unit 3 is formed integrally with the light guide member 4.

In the headlight module 100 according to the first embodiment, the first emission surface 45 and the second emission surface 46 of the light guide projection optical element 2 are described to be formed integrally. However, the configuration is not limited to this configuration; the first emission surface 45 and the second emission surface 46 may also be formed as separate components. Such a configuration has an advantage in that the shape of the light guide projection optical element 2 does not need to be complicated and the productivity increases. However, in this case, the light utilization efficiency decreases compared to the case where the first emission surface 45 and the second emission surface 46 are formed integrally on the light guide projection optical element 2.

A description has been given above of an example in which the headlight module 100 according to the first embodiment is employed for the low beam of a headlight device for an automobile. However, the headlight module 100 can be employed for other purposes such as the low beam and the high beam of headlight devices for motorcycles and motor tricycles.

In the headlight module 100 according to the first embodiment, the light guide member 4 is formed of a light-permeable refractive material and total reflection is usable, and thus the light utilization efficiency can be increased compared to a reflector made with a mirror surface.

Further, there are cases, depending on the vehicle, where a plurality of headlight modules 100 are arranged and a light distribution pattern is formed by adding together light distribution patterns of the modules. Namely, there are cases where a plurality of headlight modules 100 are arranged and a light distribution pattern is formed by adding together light distribution patterns of the modules. The headlight module 100 according to the first embodiment is usable also in such cases. A concrete example of such a configuration will be described later in a third embodiment.

Second Embodiment

Figure 12:
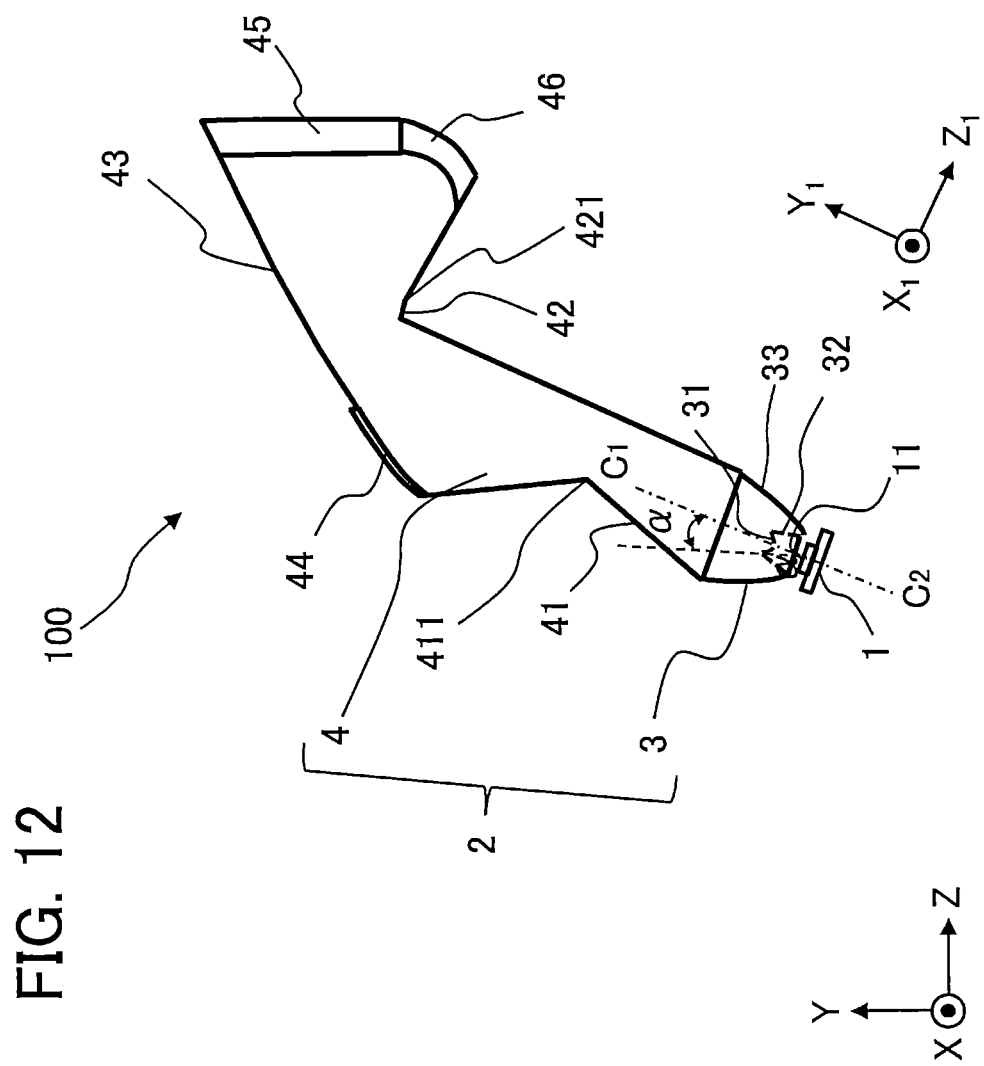
FIG. 12 is a diagram showing a configuration of a headlight module according to a second embodiment.

FIG. 12 is a diagram showing the configuration of a headlight module according to a second embodiment. In FIG. 12, each component identical or corresponding to a component shown in FIG. 1A is assigned the same reference character as in FIG. 1A. The headlight module 100 according to the second embodiment differs from the headlight module according to the first embodiment in the shape of the condensing optical unit 3. The light guide member 4 of the headlight module 100 according to the second embodiment is the same as that in the first embodiment.

In the second embodiment, the condensing optical unit 3 has a first incidence surface 31, a second incidence surface 32 and a reflecting surface 33 as shown in FIG. 12. The first incidence surface 31 is an incidence surface formed in a central part of the condensing optical unit 3. The "central part of the condensing optical unit 3" includes an intersection point where the optical axis $C_1$ of the condensing optical unit 3 intersects with the first incidence surface 31.

Further, the first incidence surface 31 is in a convex surface shape having positive power, for example. The convex surface shape of the first incidence surface 31 is a shape that is convex in the $-Y_1$-axis direction. The power is referred to also as "refractive power". The first incidence surface 31 has a rotationally symmetric shape centering at the optical axis $C_1$ as the rotation axis, for example.

The second incidence surface 32 is formed of a part of a surface shape of a body of rotation formed by rotating an ellipse around its major axis or minor axis as the rotation axis, for example. The body of rotation formed by rotating an ellipse around its major axis or minor axis as the rotation axis is referred to as a "spheroid". The rotation axis of the spheroid coincides with the optical axis $C_1$. The second incidence surface 32 has a surface shape obtained by cutting away the spheroid's both ends in the rotation axis direction. In other words, the second incidence surface 32 has a tubular shape.

One end (i.e., end in the $+Y_1$-axis direction) of the tubular shape of the second incidence surface 32 is connected to an outer periphery of the first incidence surface 31. The tubular shape of the second incidence surface 32 is formed on the light source 1's side relative to the first incidence surface 31 (i.e., in the $-Y_1$-axis direction relative to the first incidence surface 31). Namely, the tubular shape of the second incidence surface 32 is formed on the light source 1's side of the first incidence surface 31.

The reflecting surface 33 has a tubular shape whose cross-sectional shape on each $X_1Z_1$ plane is a circular shape centering at the optical axis $C_1$, for example. In the tubular shape of the reflecting surface 33, the diameter of the circular shape on an $X_1Z_1$ plane at an end in the $-Y_1$-axis direction is smaller than the diameter of the circular shape on an $X_1Z_1$ plane at an end in the $+Y_1$-axis direction. In other words, the diameter of the reflecting surface 33 gradually increases from the end in the $-Y_1$-axis direction towards the end in the $+Y_1$-axis direction.

For example, the reflecting surface 33 has a shape of a side face of a circular truncated cone. The shape of the circular truncated cone's side face on a plane including the optical axis is a linear shape. However, the shape of the reflecting surface 33 on the plane including the optical axis $C_1$ may also be a curved line shape. The "plane including the optical axis $C_1$" means a plane on which the line of the optical axis $C_1$ can be drawn.

One end (i.e., an end in the $-Y_1$-axis direction) of the tubular shape of the reflecting surface 33 is connected to the other end (i.e., an end on the $-Y_1$-axis direction) of the tubular shape of the second incidence surface 32. In other words, the reflecting surface 33 is situated on the outer peripheral side of the second incidence surface 32.

Figure 13:
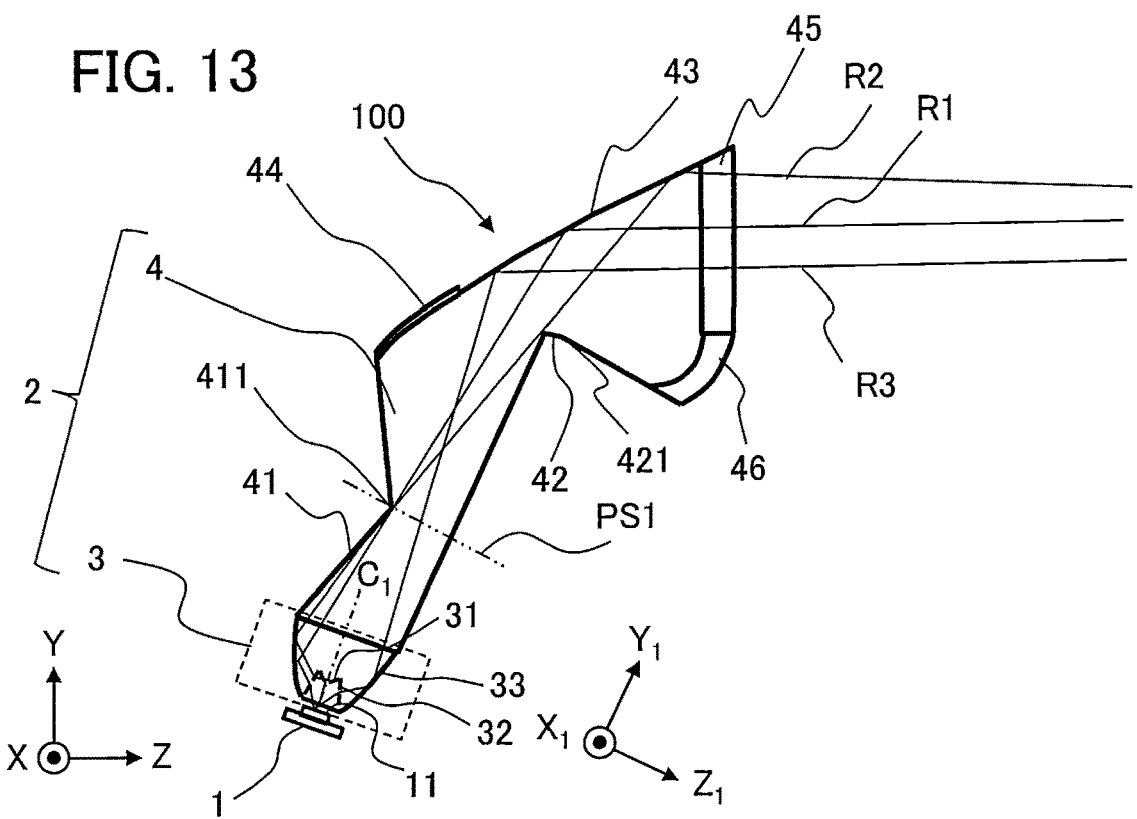
FIG. 13 is a diagram showing optical paths of light emitted from the first emission surface of the light guide member of the headlight module according to the second embodiment.
Figure 14:
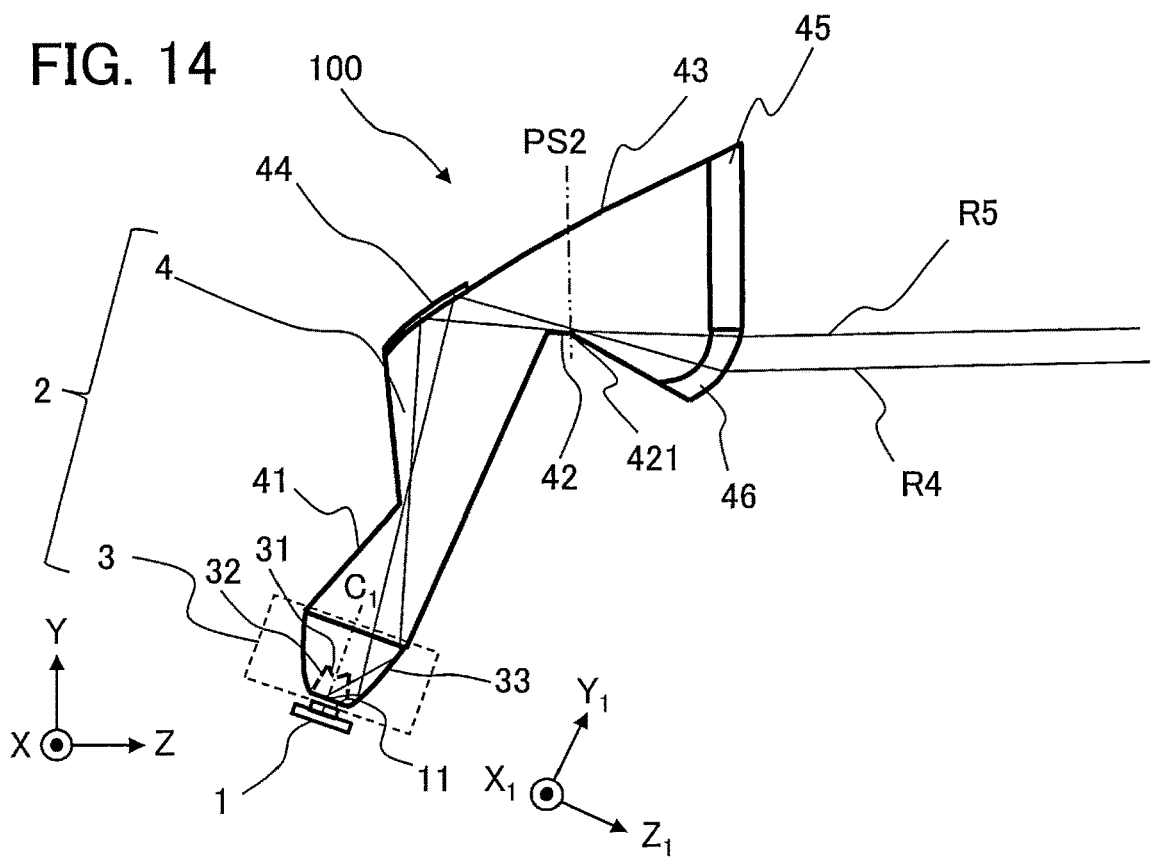
FIG. 14 is a diagram showing optical paths of light emitted from the second emission surface of the light guide member of the headlight module according to the second embodiment.

Referring to FIGS. 12 to 14, in the light emitted from the light-emitting surface 11, rays having small emission angles are incident on the first incidence surface 31. The rays having small emission angles are rays whose divergence angle is within 60 degrees, for example. The rays having small emission angles enter the condensing optical unit 3 through the first incidence surface 31 and are condensed at an intended position in the light guide member 4 ahead of (i.e., in the $+Y_1$-axis direction from) the condensing optical unit 3.

In the light emitted from the light-emitting surface 11, rays having large emission angles are incident on the second incidence surface 32. The rays having large emission angles are rays whose divergence angle is larger than 60 degrees, for example. The rays entering the condensing optical unit 3 through the second incidence surface 32 are reflected by the reflecting surface 33. The rays reflected by the reflecting surface 33 travel in the $+Y_1$-axis direction. The rays reflected by the reflecting surface 33 are condensed at an intended position in the light guide member 4 ahead of (i.e., in the $+Y_1$-axis direction from) the condensing optical unit 3.

The condensing optical unit 3 is not limited to one having the shape shown in FIG. 12 as long as the condensing optical unit 3 is an optical element having the following functions, for example: The condensing optical unit 3 condenses rays emitted from the light source 1 at small emission angles in the light guide member 4 by means of refraction. Meanwhile, the condensing optical unit 3 condenses rays emitted from the light source 1 at large emission angles in the light guide member 4 by means of reflection.

For example, a condensing position of the light condensed by the condensing optical unit 3 takes on a shape similar to the pattern of the light source 1, and thus there are cases where light distribution irregularity is caused by the projection of the shape of the light source 1. In such cases, mitigating the light distribution irregularity becomes possible by making the condensing position of the light condensed by the first incidence surface 31 and the condensing position of the light condensed by the second incidence surface 32 and the reflecting surface 33 differ from each other as described above.

Further, in the second embodiment, all of the first incidence surface 31, the second incidence surface 32 and the reflecting surface 33 of the condensing optical unit 3 have rotationally symmetric shapes centering at the optical axis $C_1$. However, the condensing optical unit 3 is not limited to a rotationally symmetric shape as long as the light emitted from the light source 1 can be condensed.

For example, by configuring the reflecting surface 33 to have an elliptic cross-sectional shape on the $X_1Z_1$ plane, a condensed light spot at the condensing position can also be formed in an elliptic shape. Then, the headlight module 100 is facilitated to generate a wide light distribution pattern.

The reflecting surface 33 of the condensing optical unit 3 has different curvatures in the $Z_1$-axis direction as a first direction orthogonal to the optical axis $C_1$ of the condensing optical unit 3 and in the $X_1$-axis direction (i.e., thickness direction of the light guide member 4) as a second direction orthogonal to both of the optical axis $C_1$ and the first direction, and the curvature in the first direction is smaller than the curvature in the second direction. With such a configuration, in the light condensed by the condensing optical unit 3, rays as light broadening in the $X_1$-axis direction and arriving at a side face 48 or 49 of the light guide member 4 can be reduced and light loss can be reduced.

It is also possible to efficiently use the light arriving at the side face 48 or the side face 49 by forming the side face 48 and the side face 49 as total reflection surfaces. However, it is difficult to control the emission direction in regard to the light arriving at the side face 48 or the side face 49, and thus it is desirable to reduce the light arriving at the side face 48 or the side face 49 as much as possible.

Also in cases where the light-emitting surface 11 of the light source 1 is in a rectangular shape, by configuring the reflecting surface 33 to have an elliptic cross-sectional shape on the $X_1Z_1$ plane, for example, the condensing optical unit 3 can be downsized further compared to the case where the reflecting surface 33 is configured to have a circular cross-sectional shape on the $X_1Z_1$ plane.

It is permissible if the condensing optical unit 3 has positive power as a whole. Each of the first incidence surface 31, the second incidence surface 32 and the reflecting surface 33 can respectively have any desired power.

The light condensed by the condensing optical unit 3 is emitted in the forward direction (i.e., the +Z-axis direction) by the first emission surface 45 or the second emission surface 46.

The optical paths of the light emitted from the first emission surface 45 and the optical paths of the light emitted by the second emission surface 46 are respectively the same as those described in the first embodiment. Except for the above-described features, the second embodiment is the same as the first embodiment.

Third Embodiment

In a third embodiment, a description will be given of a headlight device 200 employing the headlight modules 100 according to the first embodiment. FIG. 15 is a top view schematically showing a configuration example of the headlight device 200 according to the third embodiment.

The headlight device 200 includes a housing 97 and a cover 96. The cover 96 is made of a transparent material. The housing 97 is attached to the inside of the body of the vehicle. The cover 96 is arranged at a superficial part of the vehicle and is exposed to the outside of the vehicle. The cover 96 is arranged on the +Z-axis direction side (i.e., the forward direction side) of the housing 97. The cover 96 is an outer lens, for example.

One or more headlight modules 100 are accommodated in the housing 97. In FIG. 15, three headlight modules 100 are accommodated in the housing 97. However, the number of the headlight modules 100 is not limited to three. The number of the headlight modules 100 can also be one, two, or four or more. A plurality of headlight modules 100 are aligned in the X-axis direction inside the housing 97. Incidentally, the way of aligning the plurality of headlight modules 100 is not limited to the alignment in the X-axis direction. It is also possible to arrange the plurality of headlight modules 100 in a different direction such as the Y-axis direction or the Z-axis direction in consideration of design, functionality or the like.

Light emitted from the plurality of headlight modules 100 passes through the cover 96 and is emitted in the forward direction from the vehicle. In FIG. 15, illuminating light emitted from the cover 96, as a superimposition of light beams emitted from adjoining headlight modules 100, forms one light distribution pattern.

The cover 96 is provided in order to protect the headlight modules 100 from wind, rain, dust and the like. However, it is unnecessary to provide the cover 96 in cases where each headlight module 100 has a configuration in which the light guide projection optical element 2 protects the components in the headlight module 100 from wind, rain, dust and the like. In FIG. 15, the headlight modules 100 are accommodated in the housing 97. However, the housing 97 does not need to be box-shaped. It is also possible to form the housing 97 with a frame or the like and employ a configuration in which the headlight modules 100 are fixed to the frame.

As described above, the headlight device 200 including a plurality of headlight modules 100 is an aggregate of the headlight modules 100. In cases where the headlight device 200 includes one headlight module 100, the headlight device 200 is the same as the headlight module 100. The headlight device 200 according to the third embodiment may include the headlight modules 100 according to the second embodiment or headlight modules 300 according to a fourth or fifth embodiment.

Fourth Embodiment

<General Outline of Headlight Module 300>

FIG. 16A and FIG. 16B are diagrams showing the configuration of a headlight module 300 according to a fourth embodiment. The headlight module 300 is a device for a vehicle. In FIG. 16A and FIG. 16B, each component identical or corresponding to a component shown in FIG. 1A or FIG. 1B is assigned the same reference character as in FIG. 1A. The headlight module 300 according to the fourth embodiment differs from the headlight module according to the first embodiment in the shape of a light guide member 5. The condensing optical unit 3 according to the fourth embodiment is the same as that in the first embodiment or the second embodiment. FIG. 16A is a diagram showing the headlight module 300 as viewed from the right-hand side when facing the forward direction of the vehicle. FIG. 16B is a diagram showing the headlight module 300 as viewed from above.

The light guide member 5 is an optical member formed of a light-permeable material. The light guide member 5 includes a first reflecting surface 51, a second reflecting surface 52, a third reflecting surface 53, a first cutoff line formation part 511, a second cutoff line formation part 521, a first emission surface 54 and a second emission surface 55. While the first to third reflecting surfaces 51 to 53 are total reflection surfaces, the first to third reflecting surfaces 51 to 53 may also be mirror surfaces formed by metal vapor deposition or the like. However, it is desirable to make the first to third reflecting surfaces 51 to 53 of the light guide member 5 function as total reflection surfaces. That is because a total reflection surface has higher reflectance than a mirror surface and contributes to the improvement in the light utilization efficiency. Further, that is because eliminating the mirror vapor deposition process for forming the mirror surfaces can simplify the manufacturing process of the light guide member 5 and that contributes to the reduction in the manufacturing cost of the light guide member 5.

For example, the first cutoff line formation part 511 is formed to adjoin the first reflecting surface 51, and the second cutoff line formation part 521 is formed to adjoin the second reflecting surface 52. Further, the first reflecting surface 51 is a surface corresponding to the second cutoff line formation part 521, and is situated on the upper side (i.e., in the +Y-axis direction) relative to the second reflecting surface 52 in regard to the vertical direction. The third reflecting surface 53 is a surface corresponding to the first cutoff line formation part 511, and is situated on the upper side (i.e., in the +Y-axis direction) relative to the first reflecting surface 51 in regard to the vertical direction. Namely, a distance from the light source 1 to an end part of the first reflecting surface 51 in the optical axis direction is longer than a distance from the light source 1 to the second reflecting surface 52 in the optical axis direction. The first reflecting surface 51 points part of the entered condensed light in a direction in which the second reflecting surface 52, the second cutoff line formation part 521 and the second emission surface 55 are situated. The third reflecting surface 53 points part of light passing through the vicinity of the first cutoff line formation part Sil, as part of the entered condensed light, in a direction in which the first emission surface 54 is situated.

The first cutoff line formation part 511 forms light in the first light distribution pattern LD1 (an example is shown in FIG. 5 explained earlier) from the condensed light. The first light distribution pattern LD1 has the first cutoff line corresponding to the shape of the first cutoff line formation part 511.

The second cutoff line formation part 521 forms light in the second light distribution pattern LD2 (an example is shown in FIG. 7 explained earlier) from the condensed light. The second light distribution pattern LD2 has the second cutoff line 4210 corresponding to the shape of the second cutoff line formation part 521. The second cutoff line 4210 corresponding to the shape of the second cutoff line formation part 521 is a line in the stepped shape including the rising line.

The first emission surface 54 emits light in the first illuminance distribution pattern PD1 (an example is shown in FIG. 8 explained earlier) corresponding to the first light distribution pattern LD1. The first illuminance distribution pattern PD1 has the third cutoff line 91 corresponding to the shape of the first cutoff line formation part 511.

The second emission surface 55 emits light in the second illuminance distribution pattern PD2 (an example is shown in FIG. 8 explained earlier) corresponding to the second light distribution pattern LD2. The second illuminance distribution pattern PD2 has the fourth cutoff line 92 corresponding to the shape of the second cutoff line formation part 521.

Light in a combined illuminance distribution pattern (an example is shown in FIG. 8 explained earlier), obtained by adding the light in the first illuminance distribution pattern PD1 emitted from the first emission surface 54 and the light in the second illuminance distribution pattern PD2 emitted from the second emission surface 55, is applied to the illuminated surface 9.

<Light Guide Member 5>

FIG. 17A to FIG. 17C are a side view, a front view and a top view showing the configuration of the light guide member 5 of the headlight module 300 according to the fourth embodiment.

<Optical Paths of Rays R6 and R7 Emitted from First Emission Surface 54>

FIG. 18 is a diagram showing optical paths of the light emitted from the first emission surface 54 of the light guide member 5 included in the light condensed by the condensing optical unit 3. Part of the light condensed by the condensing optical unit 3 is condensed in the vicinity of the first cutoff line formation part 511 situated in the $+Y_1$-axis direction, for example.

The first reflecting surface 51 is formed on a surface connecting an end part of the light guide member 5 on the condensing optical unit 3's side and the first cutoff line formation part 511, for example. Further, the first reflecting surface 51 is situated on the +Y-axis direction side relative to the second cutoff line formation part 521. In the illustrated example, the first reflecting surface 51 is a curved surface in a shape being concave in a direction towards the inside of the light guide member 5.

In the light condensed in the vicinity of the first cutoff line formation part 511, light not reflected by the first reflecting surface 51 travels towards the third reflecting surface 53 and is reflected by the third reflecting surface 53. A surface shape of the third reflecting surface 53 corresponding to the vertical direction (Y-axis direction) is a concave surface shape. Namely, surface curvature of the third reflecting surface 53 corresponding to the vertical direction (Y-axis direction) has positive power. Further, the surface curvature of the third reflecting surface 53 corresponding to the vertical direction (Y-axis direction) is in a shape to guide the light arriving at the third reflecting surface 53 towards the first emission surface 54.

The light reflected by the third reflecting surface 53 is emitted by the first emission surface 54 in the forward direction (+2-axis direction). Surface curvature of the first emission surface 54 corresponding to the vertical direction (Y-axis direction) has positive power. Further, the surface curvature of the first emission surface 54 corresponding to the vertical direction (Y-axis direction) is in a shape with which a combined focal point of the third reflecting surface 53 and the first emission surface 54 has its focal position in the vicinity of first cutoff line formation part 511. Furthermore, the first emission surface 54 may form a lens having curvature also in the horizontal direction (X-axis direction).

A ray R6 shown in FIG. 18 is condensed by the condensing optical unit 3 to skirt the vicinity of the first cutoff line formation part 511. The ray R6 that passed through the first plane PS1 parallel to the light-emitting surface 11 of the light source 1 (i.e., orthogonal to the optical axis $C_1$) and including the first cutoff line formation part Sil is reflected by the third reflecting surface 53 and is emitted by the first emission surface 54. The ray R6 emitted from the first emission surface 54 is applied to the illuminated surface 9.

Here, the illuminated surface 9 is in the conjugate relationship with the first plane PS1 in regard to the vertical direction. Namely, a linear shape of the first cutoff line formation part 511 in the horizontal direction (i.e., the shape of the first cutoff line 4110 of the first light distribution pattern LD1) corresponds to a linear shape of the third cutoff line 91 of the first illuminance distribution pattern PD1 in the horizontal direction on the illuminated surface 9. Namely, the ray R6 after traveling to skirt the first cutoff line formation part 511, being reflected by the third reflecting surface 53 and being emitted from the first emission surface 54 is applied to the position of the third cutoff line 91 on the illuminated surface 9.

A ray R7 shown in FIG. 18 is condensed by the condensing optical unit 3, reflected by the third reflecting surface 53, and emitted by the first emission surface 54 in the forward direction similarly to the ray R6. On the first plane PS1, the ray R7 is condensed at a position farther from the first cutoff line formation part 511 in the $+Z_1$-axis direction compared to the ray R6, and thus also on the illuminated surface 9, the ray R7 is applied to a position farther from the third cutoff line 91 in the −Y-axis direction compared to the ray R6.

<Optical Paths of Rays R8 and R9 Emitted from Second Emission Surface 55>

Figure 19:
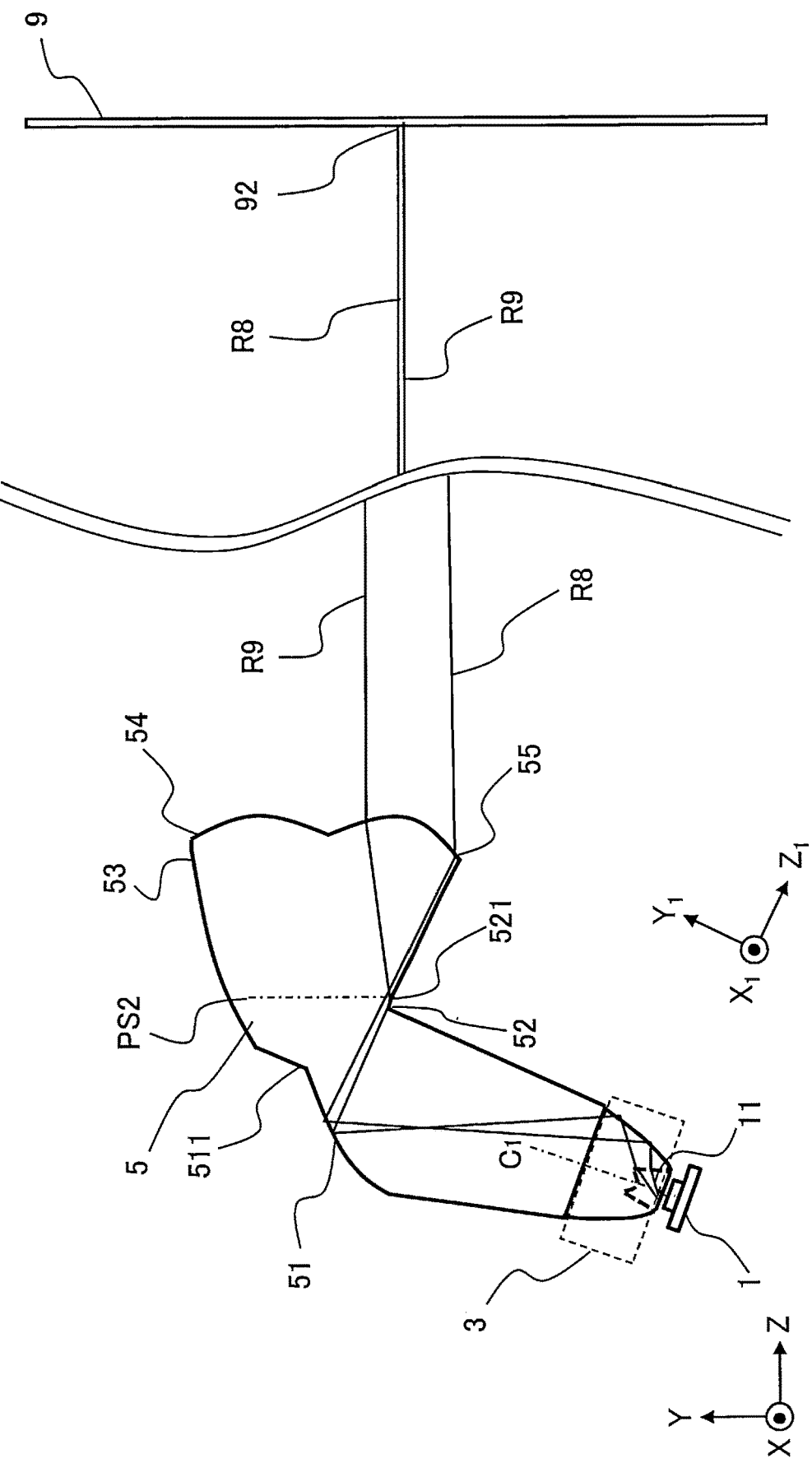
FIG. 19 is a diagram showing optical paths of light emitted from a second emission surface of the light guide member of the headlight module according to the fourth embodiment.

FIG. 19 is a diagram showing optical paths of the light emitted from the second emission surface 55 of the light guide member 5 of the headlight module 300 according to the fourth embodiment. FIG. 19 shows optical paths of the light emitted from the second emission surface 55 included in the light condensed by the condensing optical unit 3.

The first reflecting surface 51 is situated on the +Y-axis direction side relative to the second cutoff line formation part 521 and situated on the +Z-axis direction side relative to the third reflecting surface 53. The first reflecting surface 51 is, for example, in a curved surface shape having a function of reflecting incident light and condensing the light in the vicinity of the second cutoff line formation part 521. Namely, the first reflecting surface 51 is desired to have positive power.

The light reflected and condensed in the vicinity of the second cutoff line formation part 521 by the first reflecting surface 51 is emitted in the forward direction (i.e., the +Z-axis direction) by the second emission surface 55. Further, part of the light condensed in the vicinity of the second cutoff line formation part 521 is reflected by the second reflecting surface 52 and emitted in the forward direction (i.e., the +Z-axis direction) by the second emission surface 55.

The second emission surface 55 is a lens surface in a convex shape with curvature to have its focal position in the second cutoff line formation part 521. Namely, the illuminated surface 9 and the second plane PS2 including the second cutoff line formation part 521 are in the conjugate relationship. Therefore, the second emission surface 55 projects light in the second illuminance distribution pattern PD2, corresponding to the second light distribution pattern LD2 formed on the second plane PS2, onto the illuminated surface 9.

In other words, as shown in FIG. 19, a ray R8 is condensed by the condensing optical unit 3 and arrives at the first reflecting surface 51. The ray R8 after arriving at the first reflecting surface 51 passes through the second plane PS2 to skirt the vicinity of the second cutoff line formation part 521 and is emitted by the second emission surface 55.

The ray R8 emitted by the second emission surface 55 is applied to the illuminated surface 9.

Here, the illuminated surface 9 is in the conjugate relationship with the second plane PS2. Therefore, the shape of the second cutoff line formation part 521 corresponds to the shape of the fourth cutoff line 92 on the illuminated surface 9. Namely, the ray R8 after being reflected by the first reflecting surface 51, traveling to skirt the second cutoff line formation part 521 and being emitted from the second emission surface 55 is applied to the position of the fourth cutoff line 92 on the illuminated surface 9.

A ray R9 shown in FIG. 19 is condensed by the condensing optical unit 3 and arrives at the first reflecting surface 51. The ray R9 after arriving at the first reflecting surface 51 is reflected by the second reflecting surface 52 connecting to the second cutoff line formation part 521 and extending in the −Z-axis direction further than the second cutoff line formation part 521, passes through the second plane PS2 to skirt the vicinity of the second cutoff line formation part 521, and is emitted by the second emission surface 55. The ray R9 emitted by the second emission surface 55 is applied to the position of the fourth cutoff line 92 on the illuminated surface 9 similarly to the ray R8.

Incidentally, the first cutoff line formation part 511 formed the linear-shaped first cutoff line 4110 of the first light distribution pattern LD1 and the linear-shaped third cutoff line 91 of the first illuminance distribution pattern PD1. In contrast, the second cutoff line formation part 521 is capable of forming a cutoff line in the stepped shape since the illuminated surface 9 and the second plane PS2 are in the conjugate relationship. Namely, the cutoff line in the stepped shape required of the low beam for an automobile can be formed.

Fifth Embodiment

Figure 20:
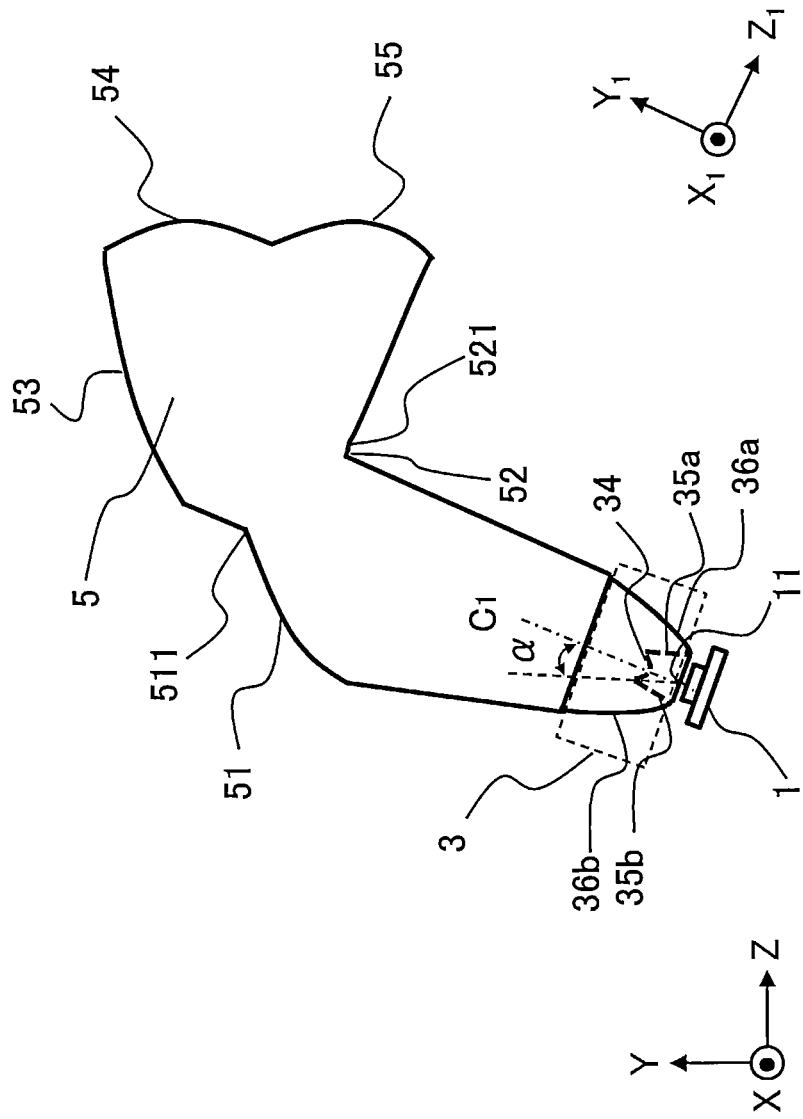
FIG. 20 is a diagram showing a configuration of a headlight module according to a fifth embodiment.

FIG. 20 is a diagram showing the configuration of a headlight module according to a fifth embodiment. In FIG. 20, each component identical or corresponding to a component shown in FIG. 16A is assigned the same reference character as in FIG. 16A. The headlight module 300 according to the fifth embodiment differs from the headlight module according to the fourth embodiment in the shape of the condensing optical unit 3. The light guide member 5 of the headlight module 300 according to the fifth embodiment is the same as that in the fourth embodiment.

In the fifth embodiment, the condensing optical unit 3 has a first incidence surface 34, a second incidence surface 35 and a condensing reflecting surface 36 as shown in FIG. 20. Further, the second incidence surface 35 and the condensing reflecting surface 36 are divided by the $X_1Y_1$ plane including the optical axis, their parts on the +Z-axis direction side are respectively described as a second incidence surface 35a and a condensing reflecting surface 36a as a first condensing reflecting surface, and their parts on the −Z-axis direction side are respectively described as a second incidence surface 35b and a condensing reflecting surface 36b as a second condensing reflecting surface.

The first incidence surface 34 is an incidence surface formed in a central part of the condensing optical unit 3. The "central part of the condensing optical unit 3" includes an intersection point where the optical axis $C_1$ of the condensing optical unit 3 intersects with the first incidence surface 34.

Further, the first incidence surface 34 is in a convex surface shape having positive power, for example. The convex surface shape of the first incidence surface 34 is a shape that is convex in the $-Y_1$-axis direction. The power is referred to also as "refractive power". Furthermore, the first incidence surface 34 is in a shape having different curvatures in the X-axis direction and the Z-axis direction, for example.

Each of the second incidence surface 35a and the second incidence surface 35b is formed of a part of a surface shape of a body of rotation formed by rotating an ellipse around its major axis or minor axis as the rotation axis, for example. The body of rotation formed by rotating an ellipse around its major axis or minor axis as the rotation axis is referred to as a "spheroid". The rotation axis of the spheroid coincides with the optical axis $C_1$. The second incidence surfaces 35a and 35b have a surface shape obtained by cutting away the spheroid's both ends in the rotation axis direction. In other words, the second incidence surface 35 has a tubular shape.

One end (i.e., end in the $+Y_1$-axis direction) of the tubular shape of the second incidence surfaces 35a and 35b is connected to an outer periphery of the first incidence surface 34. Further, diameters of the second incidence surface 35a and the second incidence surface 35b may differ from each other as long as the one end (i.e., end in the $+Y_1$-axis direction) of the second incidence surfaces 35a and 35b is connected to the outer periphery of the first incidence surface 34. The tubular shape of the second incidence surfaces 35a and 35b is formed on the light source 1's side with respect to the first incidence surface 34 (i.e., on the $-Y_1$-axis direction side relative to the first incidence surface 34).

The condensing reflecting surfaces 36a and 36b are in a tubular shape having an elliptic shape centering at the optical axis $C_1$, for example. In the tubular shape of the condensing reflecting surfaces 36a and 36b, the diameters of the major axis and the minor axis of the elliptic shape on an $X_1Z_1$ plane at an end in the $-Y_1$-axis direction are smaller than the diameters of the major axis and the minor axis of the elliptic shape on an $X_1Z_1$ plane at an end in the $+Y_1$-axis direction. In other words, the diameters of the condensing reflecting surfaces 36a and 36b gradually increase from the and in the $-Y_1$-axis direction towards the end in the $+Y_1$-axis direction.

The shape of the condensing reflecting surfaces 36a and 36b on a plane including the optical axis $C_1$ is a curved line shape. The "plane including the optical axis $C_1$" means a plane on which the line of the optical axis $C_1$ can be drawn.

One end (i.e., an end in the $-Y_1$-axis direction) of the tubular shape of the condensing reflecting surfaces 36a and 36b is connected to the other end (i.e., an end on the $-Y_1$-axis direction) of the tubular shape of the second incidence surfaces 35a and 35b. In other words, the condensing reflecting surfaces 36a and 36b are situated on the outer peripheral side of the second incidence surfaces 35a and 35b.

The condensing reflecting surfaces 36a and 36b have different curvatures in the $Z_1$-axis direction as the first direction orthogonal to the optical axis $C_1$ of the condensing optical unit 3 and in the $X_1$-axis direction (i.e., thickness direction of the light guide member 5) as the second direction orthogonal to both of the optical axis $C_1$ and the first direction. Further, in the $Z_1$-axis direction, the condensing reflecting surface 36a and the condensing reflecting surface 36b have curvatures different from each other, and the curvature of the condensing reflecting surface 36a is larger than the curvature of the condensing reflecting surface 36b. With this configuration, in the light condensed by the condensing optical unit 3, light reflected by the condensing reflecting surface 36a can be condensed once and guided to the first reflecting surface 51 of the light guide member 5 and light reflected by the condensing reflecting surface 36b can be guided to the first cutoff line formation part 511 of the light guide member 5. By this, angles of light incident upon the first reflecting surface 51 and the third reflecting surface 53 of the light guide member 5 can be limited and the light loss can be reduced. Further, forming the light distribution is easy and the light distribution irregularity can be reduced.

Components in the first to fifth embodiments described above can be appropriately combined with each other.

In the above-described first to fifth embodiments, terms indicating positional relationship between components or the shape of a component are intended to include a range allowing for tolerances in the manufacture, variations in the assembly, or the like. Further, terms like "parallel" and "orthogonal" indicating positional relationship between components or the shape of a component are intended to include a range allowing for tolerances in the manufacture, variations in the assembly, or the like. Therefore, when a description indicating positional relationship between components or the shape of a component is included in the claims, such a description is intended to include a range allowing for tolerances in the manufacture, variations in the assembly, or the like.

DESCRIPTION OF REFERENCE CHARACTERS 100, 300: headlight module, 200: headlight device, 1: light source, 11: light-emitting surface, 2: light guide projection optical element, 3: condensing optical unit, 31: first incidence surface, 32: second incidence surface, 33: reflecting surface, 34: first incidence surface, 35, 35a, 35b: second incidence surface, 36: condensing reflecting surface, 36a: condensing reflecting surface (first condensing reflecting surface), 36b: condensing reflecting surface (second condensing reflecting surface), 4: light guide member, 41: first reflecting surface, 42: second reflecting surface, 43: third reflecting surface, 44: fourth reflecting surface, 45: first emission surface, 46: second emission surface, 411: first cutoff line formation part, 4110: first cutoff line, 421: second cutoff line formation part, 4210; second cutoff line, 421A: first ridge line part, 421B: second ridge line part, 421C; third ridge line part, 5: light guide member, 51: first reflecting surface, 52: second reflecting surface, 53: third reflecting surface, 54: first emission surface, 55: second emission surface, 511: first cutoff line formation part, 521: second cutoff line formation part, 9: illuminated surface, 91: third cutoff line, 92: fourth cutoff line, 96: cover, 97: housing, $C_1$: optical axis, $C_2$: optical axis, LD1: first light distribution pattern, LD2: second light distribution pattern, PD1: first illuminance distribution pattern, PD2: second illuminance distribution pattern, PS1: first plane, PS2; second plane, R1, R2, R3: ray, R4, R5: ray, R6, R7: ray, R8, R9: ray.

What is claimed is:

1. A headlight module comprising:
   a light source;
   a condensing optical unit that allows light generated by the light source to enter and transforms the light into condensed light; and
   a light guide member including a first cutoff line formation part that forms light in a first light distribution pattern from the condensed light, a second cutoff line formation part that forms light in a second light distribution pattern from the condensed light, a first emission surface that emits light in a first illuminance distribution pattern corresponding to the first light distribution pattern, and a second emission surface that emits light in a second illuminance distribution pattern corresponding to the second light distribution pattern,
   wherein light in a combined illuminance distribution pattern obtained by adding the light in the first illuminance distribution pattern emitted from the first emission surface and the light in the second illuminance distribution pattern emitted from the second emission surface is emitted, and
   the second emission surface is a lens surface in a convex shape with curvature to have its focal position in the second cutoff line formation part.

2. The headlight module according to claim 1, wherein
   the first emission surface and the second emission surface are arranged next to one another a predetermined arrangement direction, and
   broadening of the light in the first illuminance distribution pattern emitted from the first emission surface in a direction orthogonal to the arrangement direction is wider than broadening of the light in the second illuminance distribution pattern emitted from the second emission surface in the direction orthogonal to the arrangement direction.

3. The headlight module according to claim 1, wherein
   the condensing optical unit has an incidence surface and a reflecting surface,
   the reflecting surface has different curvatures in a first direction orthogonal to an optical axis of the condensing optical unit and in a second direction orthogonal to both of the optical axis and the first direction, and
   the curvature in the first direction is smaller than the curvature in the second direction.

4. The headlight module according to claim 1, wherein when the headlight module is mounted on a vehicle, the first emission surface and the second emission surface are situated next to one another a vertical direction to adjoin each other.

5. The headlight module according to claim 1, wherein the light guide member is an optical element formed of a light-permeable material.

6. The headlight module according to claim 1, wherein the condensing optical unit is a condensing optical element formed of a light-permeable material.

7. A headlight device comprising a housing, and one or more headlight modules according to claim 1.

8. The headlight module according to claim 1, wherein the light guide member further includes:
   a first reflecting surface formed to adjoin the first cutoff line formation part; and
   a second reflecting surface formed to adjoin the second cutoff line formation part.

9. The headlight module according to claim 8, wherein the light guide member further includes:
   a third reflecting surface that has its focal position in a vicinity of the first cutoff line formation part and points part of light passing through the vicinity of the first cutoff line formation part, as part of the condensed light, in a direction in which the first emission surface is situated; and
   a fourth reflecting surface that is arranged at a position closer to the light source than the third reflecting surface and points part of the condensed light in a direction in which the second reflecting surface, the second cutoff line formation part and the second emission surface are situated.

10. The headlight module according to claim 1, wherein
the first light distribution pattern has a first cutoff line having a shape corresponding to a shape of the first cutoff line formation part,
the second light distribution pattern has a second cutoff line having a shape corresponding to a shape of the second cutoff line formation part, and
the second cutoff line corresponding to the shape of the second cutoff line formation part includes a stepped shape.

11. The headlight module according to claim 10, wherein the stepped shape includes:
a first ridge line part;
a third ridge line part; and
a second ridge line part connecting an end part of the first ridge line part and an end part of the third ridge line part to each other and being inclined with respect to the first ridge line part and the third ridge line part.

12. The headlight module according to claim 10, wherein
the first illuminance distribution pattern has a third cutoff line having a shape corresponding to the shape of the first cutoff line, and
the second illuminance distribution pattern has a fourth cutoff line having a shape corresponding to the shape of the second cutoff line.

13. The headlight module according to claim 10, wherein
the first emission surface and the second emission surface are arranged next to one another in a predetermined arrangement direction,
the first light distribution pattern formed on a surface including the first cutoff line formation part is not inverted in the arrangement direction and emitted from the first emission surface as the light in the first illuminance distribution pattern, and
the second light distribution pattern formed on a surface including the second cutoff line formation part is inverted in the arrangement direction and emitted from the second emission surface as the light in the second illuminance distribution pattern.

14. The headlight module according to claim 1, wherein the light guide member further includes:
a first reflecting surface that has an end part, formed to adjoin the first cutoff line formation part, at a position closest to the first emission surface and condenses part of the condensed light in the second cutoff line formation part; and
a second reflecting surface formed to adjoin the second cutoff line formation part.

15. The headlight module according to claim 14, wherein a distance from the light source to the end part of the first reflecting surface in an optical axis direction of the condensing optical unit is longer than a distance from the light source to the second reflecting surface in the optical axis direction.

16. The headlight module according to claim 15, wherein
the light guide member has a third reflecting surface that points light after passing through the first cutoff line formation part, as part of the condensed light, in a direction in which the first emission surface is situated, and
the third reflecting surface and the first emission surface are provided so that a combined focal point of the third reflecting surface and the first emission surface is situated in a vicinity of the first cutoff line formation part.

17. The headlight module according to claim 16, wherein
the condensing optical unit has an incidence surface and a condensing reflecting surface,
the condensing reflecting surface has different curvatures in a first direction orthogonal to an optical axis of the condensing optical unit and in a second direction orthogonal to both of the optical axis and the first direction, and
when the condensing reflecting surface is divided by a plane including the optical axis of the condensing optical unit and the first direction and a side of the condensing reflecting surface close to the first emission surface and a side of the condensing reflecting surface far from the first emission surface are respectively defined as a first condensing reflecting surface and a second condensing reflecting surface, the first condensing reflecting surface and the second condensing reflecting surface differ from each other in curvature in the second direction.

18. The headlight module according to claim 17, wherein in the second direction, the curvature of the first condensing reflecting surface is larger than the curvature of the second condensing reflecting surface.

* * * * *